US011051351B2

(12) United States Patent
Jin

(10) Patent No.: US 11,051,351 B2
(45) Date of Patent: *Jun. 29, 2021

(54) METHOD FOR ACCESSING LOCAL NETWORK, AND RELATED DEVICE

(71) Applicant: Huawei Technologies Co., Ltd., Shenzhen (CN)

(72) Inventor: Weisheng Jin, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/945,356

(22) Filed: Jul. 31, 2020

(65) Prior Publication Data

US 2020/0367302 A1    Nov. 19, 2020

Related U.S. Application Data

(63) Continuation of application No. 16/412,012, filed on May 14, 2019, now Pat. No. 10,743,360, which is a
(Continued)

(51) Int. Cl.
*H04W 76/15*    (2018.01)
*H04W 60/00*    (2009.01)
(Continued)

(52) U.S. Cl.
CPC ......... *H04W 76/15* (2018.02); *H04L 61/1511* (2013.01); *H04W 8/065* (2013.01);
(Continued)

(58) Field of Classification Search
CPC ... H04W 76/15; H04W 60/005; H04W 8/065; H04W 92/02; H04W 88/06; H04L 61/1511
See application file for complete search history.

(56) References Cited

U.S. PATENT DOCUMENTS

2008/0311911 A1    12/2008    Koodli et al.
2011/0103310 A1    5/2011    Stojanovski et al.
(Continued)

FOREIGN PATENT DOCUMENTS

CN    101674578 A    3/2010
CN    101932121 A    12/2010
(Continued)

OTHER PUBLICATIONS

Data Offloading Techniques in 3GPP Rel 10 Network (Year: 2012).*
U.S. Appl. No. 15/923,905, filed Mar. 16, 2018.
U.S. Appl. No. 16/412,012, filed May 14, 2019.

*Primary Examiner* — Nizar N Sivji
(74) *Attorney, Agent, or Firm* — Leydig, Voit & Mayer, Ltd.

(57) ABSTRACT

Embodiments of the present application disclose a method for accessing a local network, and a related device, so that a user equipment can simultaneously access an operator network and a local network. The method in the embodiments of the present application includes: receiving, by an MME, an access request of user equipment UE that is sent by an base station eNB, where the access request carries access information of the UE; determining, according to the access information of the UE, a first local gateway corresponding to the UE; and establishing, for the UE, a user plane bearer that is from the eNB to a gateway C-GW of a core network and that includes the first local gateway used as an intermediate node.

20 Claims, 10 Drawing Sheets

Related U.S. Application Data continuation of application No. 15/923,905, filed on Mar. 16, 2018, now Pat. No. 10,299,309, which is a continuation of application No. PCT/CN2015/089982, filed on Sep. 18, 2015.

(51) Int. Cl.

| | | |
|---|---|---|
| *H04L 29/12* | (2006.01) | |
| *H04W 8/06* | (2009.01) | |
| *H04W 92/02* | (2009.01) | |
| *H04W 88/06* | (2009.01) | |

(52) U.S. Cl.
CPC .......... *H04W 60/005* (2013.01); *H04W 88/06* (2013.01); *H04W 92/02* (2013.01)

(56) References Cited

U.S. PATENT DOCUMENTS

| | | |
|---|---|---|
| 2011/0158171 A1 | 6/2011 | Centonza et al. |
| 2012/0046058 A1* | 2/2012 | Vesterinen ............ H04W 8/082 455/509 |
| 2012/0051348 A1 | 3/2012 | Zhu et al. |
| 2012/0108216 A1 | 5/2012 | Wohlwend et al. |
| 2012/0258767 A1 | 10/2012 | Liang et al. |
| 2013/0258967 A1 | 10/2013 | Watfa et al. |
| 2014/0016614 A1 | 1/2014 | Velev et al. |
| 2014/0024375 A1 | 1/2014 | Fitzpatrick et al. |
| 2014/0105145 A1 | 4/2014 | Gao et al. |
| 2014/0143413 A1 | 5/2014 | Fang |
| 2014/0369198 A1* | 12/2014 | Rinne ................... H04L 45/245 370/235 |
| 2015/0029999 A1* | 1/2015 | Horn ..................... H04W 76/12 370/331 |
| 2015/0359019 A1 | 12/2015 | Chen et al. |
| 2016/0112945 A1 | 4/2016 | Ch En et al. |
| 2016/0212777 A1* | 7/2016 | Landgren ................ H04W 8/08 |
| 2017/0013652 A1 | 1/2017 | Centonza et al. |
| 2017/0078927 A1 | 3/2017 | Hahn |
| 2017/0339556 A1 | 11/2017 | Xu |

FOREIGN PATENT DOCUMENTS

| | | |
|---|---|---|
| CN | 102056129 A | 5/2011 |
| CN | 102740404 A | 10/2012 |
| CN | 103945559 A | 7/2014 |
| CN | 104185209 A | 12/2014 |
| EP | 2445261 A1 | 4/2012 |
| EP | 2709340 A1 | 3/2014 |
| EP | 2824990 A1 | 1/2015 |
| RU | 2480928 C2 | 4/2013 |
| WO | 2013185683 A2 | 12/2013 |

\* cited by examiner

METHOD FOR ACCESSING LOCAL NETWORK, AND RELATED DEVICE

CROSS-REFERENCE TO RELATED APPLICATIONS

This application is a continuation of U.S. patent application Ser. No. 16/412,012, filed on May 14, 2019, which is continuation of U.S. patent application Ser. No. 15/923,905, filed on Mar. 16, 2018, now U.S. Pat. No. 10,299,309, which is a continuation of International Patent Application No. PCT/CN2015/089982, filed on Sep. 18, 2015. All of the afore-mentioned patent applications are hereby incorporated by reference in their entireties.

TECHNICAL FIELD

Embodiments of the present application relate to the communications field, and in particular, to a method for accessing a local network, and a related device.

BACKGROUND

In recent years, Long Term Evolution (LTE)/4G core network (Evolved Packet Core, EPC) networks have become a main technology used in the global fourth generation mobile telecommunications because of high bandwidth and high service quality. Rapid popularization of intelligent terminals and mobile applications also brings rapid development of the mobile Internet.

Bring your own device (BYOD) becomes a trend among enterprises. Currently, in a BYOD wireless office scenario in an enterprise, a local network is still accessed mainly by using a local wireless router and by using a Wireless Fidelity (Wi-Fi) technology.

However, after accessing the local network by using Wi-Fi, a user equipment cannot use an operator network (such as a 4G communications network with high bandwidth and high service quality). If the operator network needs to be used, the Wi-Fi connection needs to be first disconnected. Consequently, the user cannot access the local network.

SUMMARY

Embodiments of the present application provide a method for accessing a local network, and a related device, so that a user equipment can simultaneously access an operator network and a local network.

A first aspect of the embodiments of the present application provides a method for accessing a local network, where the method includes:

receiving, by a mobility management entity MME, an access request of user equipment UE that is sent by a base station eNB, where the access request carries access information of the UE;

determining, by the MME according to the access information of the UE, a first local gateway corresponding to the UE, where the first local gateway is a gateway of a first local network; and establishing, by the MME for the UE, a user plane bearer that is from the eNB to a gateway C-GW of a core network and that includes the first local gateway used as an intermediate node.

The mobility management entity MME in the core network can determine, according to the access information of the user equipment UE that is carried in the access request of the UE that is sent by the base station eNB, the first local gateway corresponding to the UE, where the first local gateway is the gateway of the first local network; and establish, for the UE, the user plane bearer that is from the eNB to the gateway C-GW of the core network and that includes the first local gateway used as the intermediate node. In this way, because the first local gateway is used as the intermediate node in the user plane bearer, a data connection is established between the eNB and each of the gateway C-GW of the core network and the gateway of the first local network. The UE can access not only an operator network but also the first local network by using the eNB, so that a user equipment can simultaneously access the operator network and the local network.

With reference to the first aspect of the embodiments of the present application, in a first implementation of the first aspect of the embodiments of the present application, before the determining, by the MME according to the access information of the UE, a first local gateway corresponding to the UE, the method further includes:

obtaining, by the MME, function information of the eNB;

determining, by the MME according to the function information of the eNB, whether the eNB supports a local gateway connection; and when determining that the eNB supports the local gateway connection, triggering, by the MME, the step of determining, by the MME according to the access information of the UE, a first local gateway corresponding to the UE.

A subsequent step is triggered only when it is determined, according to the function information of the eNB, that the eNB supports the local gateway connection, so as to prevent a system from performing an unnecessary step, so that system operation efficiency is improved.

With reference to the first aspect or the first implementation of the first aspect of the embodiments of the present application, in a second implementation of the first aspect of the embodiments of the present application, the access information includes the UE identifier, the UE identifier is used to uniquely identify the UE, and the determining, by the MME according to the access information of the UE, a first local gateway corresponding to the UE specifically includes:

searching, by the MME according to the UE identifier, a user management server for the first local gateway corresponding to the UE.

The user management server is searched, according to the UE identifier, for the first local gateway corresponding to the UE, so as to ensure that the first local gateway is quickly and accurately found.

With reference to the second implementation of the first aspect of the embodiments of the present application, in a third implementation of the first aspect of the embodiments of the present application, the first local gateway is a local gateway having a highest priority in multiple local gateways corresponding to the UE.

One UE may correspond to multiple local gateways having different priorities, so that adaptability of the solution to various scenarios is enhanced.

With reference to the first implementation of the first aspect of the embodiments of the present application, in a fourth implementation of the first aspect of the embodiments of the present application, the function information of the eNB further includes information about a local gateway accessed by the eNB, the access information includes the UE identifier, and the UE identifier is used to uniquely identify the UE; and the determining, by the MME according to the access information of the UE, a first local gateway corresponding to the UE specifically includes:

determining, by the MME according to the information about the local gateway accessed by the eNB and the UE identifier, the first local gateway corresponding to the UE.

The first local gateway corresponding to the UE can be determined according to the UE identifier and the information about the local gateway accessed by the eNB, so as to better meet an actual user requirement and improve man-machine interaction performance.

With reference to any one of the second implementation to the fourth implementation of the first aspect of the embodiments of the present application, in a fifth implementation of the first aspect of the embodiments of the present application, after the step of establishing, by the MME for the UE, a user plane bearer that is from the eNB to the C-GW and that includes the first local gateway used as an intermediate node, the method further includes:

when the MME determines that a local gateway corresponding to the UE is updated to a third local gateway, establishing, by the MME for the UE, a user plane bearer that is from the eNB to the C-GW and that includes the third local gateway used as an intermediate node, where the third local gateway is a gateway of a third local network.

The user plane bearer can be automatically reestablished according to an update to the local network corresponding to the UE, so that user experience is improved, and system intelligence is improved.

With reference to any one of the second implementation to the fourth implementation of the first aspect of the embodiments of the present application, in a sixth implementation of the first aspect of the embodiments of the present application, the method further includes:

obtaining, by the MME according to the UE identifier, a first subnet corresponding to the UE, where the first subnet is located in the first local network; and sending, by the MME, a first routing instruction to the first local gateway, where the first routing instruction includes an identifier of the first subnet and the UE identifier, and the first routing instruction is used to instruct to route, to the first subnet, data used by the UE to access the first local network.

The subnet corresponding to the UE in the local network can be determined, and the routing instruction is sent to the local gateway, so that the local gateway routes, to the subnet, all data used by the UE to access the local network, so as to implement precise control on network access permission.

With reference to the sixth implementation of the first aspect of the embodiments of the present application, in a seventh implementation of the first aspect of the embodiments of the present application, the obtaining, by the MME according to the UE identifier, a first subnet corresponding to the UE specifically includes:

determining, by the MME according to the UE identifier, a user group corresponding to the UE; and determining, by the MME according to location information of the UE and/or a current time and the user group, the first subnet corresponding to the UE.

The user group corresponding to the UE can be first determined, and then the first subnet corresponding to the UE is determined according to related information, so as to implement precise multi-control on network access permission.

With reference to the sixth implementation or the seventh implementation of the first aspect of the embodiments of the present application, in an eighth implementation of the first aspect of the embodiments of the present application, after the step of establishing, by the MME for the UE, a user plane bearer that is from the eNB to a gateway C-GW of a core network and that includes the first local gateway used as an intermediate node, the method further includes:

determining, by the MME, that a subnet corresponding to the UE is updated to a third subnet;

determining, by the MME, that the third subnet is located in a second local network, wherein the second local network is different from the first local network;

determining, by the MME, that a gateway of the second local network is a second local gateway; and establishing, by the MME for the UE, a user plane bearer that is from the eNB to the C-GW and that includes the second local gateway used as an intermediate node.

The user plane bearer can be automatically reestablished according to an update to the subnet corresponding to the UE, so that user experience is improved, and system intelligence is improved.

With reference to the eighth implementation of the first aspect of the embodiments of the present application, in a ninth implementation of the first aspect of of the embodiments of the present application, after the step of determining, by the MME, that a gateway of the second local network is a second local gateway, the method further includes:

sending, by the MME, a third routing instruction to the second local gateway, where the third routing instruction includes an identifier of the third subnet and the UE identifier, and the routing instruction is used to instruct to route, to the third subnet, data used by the UE to access the second local network.

The data is automatically routed according to the reestablished user plane bearer, so that system intelligence is improved.

With reference to any one of the second implementation to the ninth implementation of the first aspect of the embodiments of the present application, in a tenth implementation of the first aspect of the embodiments of the present application, after the step of establishing, by the MME for the UE, a user plane bearer that is from the eNB to the C-GW and that includes the local gateway used as an intermediate node, the method further includes:

obtaining, by the MME according to the UE identifier, a network name of the subnet corresponding to the UE; and sending, by the MME, the network name to the UE by using a non-access stratum NAS message, so that the UE displays the network name on a user interface.

The network name can be displayed on the user interface of the UE, so as to help the user more intuitively know a currently accessed subnet, and improve man-machine interaction performance.

With reference to any one of the sixth implementation to the tenth implementation of the first aspect of the embodiments of the present application, in an eleventh implementation of the first aspect of the embodiments of the present application, the method further includes:

notifying, by the MME, the C-GW of the subnet currently corresponding to the UE;

receiving, by the MME, a domain name system server address that is assigned to the subnet corresponding to the UE and that is returned by the C-GW, where a domain name system server identified by the domain name system server address stores a correspondence between a domain name and an IP address of a network device in the subnet corresponding to the UE; and sending, by the MME to the UE, the domain name system server address assigned to the subnet corresponding to the UE.

The domain name system server address is assigned to the subnet corresponding to the UE, so that precise domain name resolution is implemented.

With reference to any one of the first aspect to the eleventh implementation of the first aspect of the embodiments of the present application, in a twelfth implementation of the first aspect of the embodiments of the present application, the method further includes:

notifying, by the MME, the C-GW of a local network currently corresponding to the UE;

receiving, by the MME, a domain name system server address that is assigned to the local network corresponding to the UE and that is returned by the C-GW, where a domain name system server identified by the domain name system server address stores a correspondence between a domain name and an IP address of a network device in the local network corresponding to the UE; and sending, by the MME to the UE, the domain name system server address assigned to the local network corresponding to the UE.

The domain name system server address is assigned to the local network corresponding to the UE, so that precise domain name resolution is implemented.

With reference to any one of the first aspect to the twelfth implementation of the first aspect of the embodiments of the present application, in a thirteenth implementation of the first aspect of the embodiments of the present application, the establishing, by the MME for the UE, a user plane bearer that is from the eNB to a gateway C-GW of a core network and that includes the first local gateway used as an intermediate node specifically includes:

obtaining, by the MME, an IP address and an end point identifier of a tunnel from the local gateway to the C-GW that are assigned by the C-GW, and sending, to the local gateway, the IP address and the end point identifier of the tunnel from the local gateway to the C-GW that are assigned by the C-GW;

obtaining, by the MME, an IP address and an end point identifier of a tunnel from the local gateway to the eNB that are assigned by the eNB, and sending, to the local gateway, the IP address and the end point identifier of the tunnel from the local gateway to the eNB that are assigned by the eNB; and obtaining, by the MME, an IP address and an end point identifier of a tunnel from the C-GW to the local gateway that are assigned by the local gateway and an IP address and an end point identifier of a tunnel from the eNB to the local gateway that are assigned by the local gateway, sending, to the C-GW, the IP address and the end point identifier of the tunnel from the C-GW to the local gateway that are assigned by the local gateway, and sending, to the eNB, the IP address and the end point identifier of the tunnel from the eNB to the local gateway that are assigned by the local gateway.

The IP addresses and the end point identifiers of the tunnels are assigned to network elements, so as to ensure that the user plane bearer in which the local gateway is used as the intermediate node is smoothly established, and ensure stability of the established user plane bearer.

A second aspect of the embodiments of the present application provides a method for accessing a local network, where the method includes:

receiving, by a local gateway, a user plane establishment request sent by a mobility management entity MME, where the user plane establishment request includes information about a user plane bearer that is established by a gateway C-GW of a core network for UE and that is from the local gateway to the C-GW, the UE accesses the core network by using an eNB, and the local gateway is a local gateway corresponding to the UE; and establishing, by the local gateway for the UE according to the user plane establishment request, a user plane bearer that is from the eNB to the C-GW and that includes the local gateway used as an intermediate node.

The local gateway can establish, for the UE, the user plane bearer in which the local gateway is used as the intermediate node, so that the UE accesses an operator network and the local network in which the local gateway is used as a gateway.

With reference to the second aspect of the embodiments of the present application, in a first implementation of the second aspect of the embodiments of the present application, the method further includes:

determining, by the local gateway, whether received data used by the UE to access a network is data used to access the local network; and when determining that the data used by the UE to access a network is the data used to access the local network, routing, by the local gateway to the local network, the data used by the UE to access a network; or when determining that the data used by the UE to access a network is not the data used to access the local network, forwarding, by the local gateway to the C-GW, the data used by the UE to access a network.

Data is forwarded in different paths according to whether the data is the data used to access the local network, so as to implement precise control on network data access, and improve a data processing rate.

With reference to the first implementation of the second aspect of the embodiments of the present application, in a second implementation of the second aspect of the embodiments of the present application, after the step of establishing, by the local gateway for the UE according to the user plane establishment request, a user plane bearer that is from the eNB to the C-GW and that includes the local gateway used as an intermediate node, and before the step of routing, by the local gateway to the local network, the data used by the UE to access a network, the method further includes:

determining, by the local gateway according to a UE identifier, a subnet corresponding to the UE, where the UE identifier is used to uniquely identify the UE, the user plane establishment request includes the UE identifier, and the step of routing, by the local gateway to the local network, the data used by the UE to access a network includes: routing, by the local gateway to the subnet corresponding to the UE, the data used by the UE to access a network.

After establishing, for the UE, the user plane bearer in which the local gateway is used as the intermediate node, the local gateway obtains the subnet corresponding to the UE, and routes, to the subnet corresponding to the UE, the data used by the UE to access the local network, so as to implement fine control on network access permission.

With reference to the first implementation of the second aspect of the embodiments of the present application, in a third implementation of the second aspect of the embodiments of the present application, after the step of establishing, by the local gateway for the UE according to the user plane establishment request, a user plane bearer that is from the eNB to the C-GW and that includes the local gateway used as an intermediate node, and before the step of routing, by the local gateway to the local network, the data used by the UE to access a network, the method further includes:

receiving, by the local gateway, a routing instruction sent by the MME, where the routing instruction includes a subnet identifier and a UE identifier, the UE identifier is used to uniquely identify the UE, and the subnet identifier is used to uniquely identify a subnet; and the routing, by the local gateway to the local network, the data used by the UE to access a network specifically includes:

routing, by the local gateway according to the routing instruction to the subnet identified by the subnet identifier in the routing instruction, the data used by the UE to access a network.

In the embodiments of the present application, the MME obtains the subnet identifier corresponding to the UE, and the local gateway receives the routing instruction sent by the MME, and routes, according to the routing instruction to the subnet identified by the subnet identifier, the data used by the UE to access the local network, so as to implement fine control on network access permission, and relieve data processing pressure of the local gateway.

With reference to any one of the first implementation to the third implementation of the second aspect of the embodiments of the present application, in a fourth implementation of the second aspect of the embodiments of the present application, the determining, by the local gateway, whether received data used by the UE to access a network is data used to access the local network specifically includes:

when the local gateway receives the data used by the UE to access a network, determining, by the local gateway according to a destination IP address of the data used by the UE to access a network, whether the data used by the UE to access a network is the data used to access the local network, where the local gateway stores a list of an IP address of a network device in the local network.

It is determined, according to the destination IP address of the data used by the UE to access a network, whether the data is the data used to access the local network, so as to ensure accuracy of the determining.

With reference to any one of the second aspect to the fourth implementation of the second aspect of the embodiments of the present application, in a fifth implementation of the second aspect of the embodiments of the present application, the receiving, by a local gateway, a user plane establishment request sent by a mobility management entity MME specifically includes:

obtaining, by the local gateway, an IP address and an end point identifier of a tunnel from the local gateway to the C-GW that are assigned by the C-GW to a user plane of the UE; and the establishing, by the local gateway for the UE according to the user plane establishment request, a user plane bearer that is from the eNB to the C-GW and that includes the local gateway used as an intermediate node specifically includes:

assigning, by the local gateway to the user plane of the UE, an IP address and an end point identifier of a tunnel from the C-GW to the local gateway and an IP address and an end point identifier of a tunnel from the eNB to the local gateway, and sending, to the MME, the IP address and the end point identifier of the tunnel from the C-GW to the local gateway that are assigned by the local gateway and the IP address and the end point identifier of the tunnel from the eNB to the local gateway that are assigned by the local gateway.

The IP addresses and the end point identifiers of the tunnels are obtained and assigned, so as to ensure smooth establishment and stability of the user plane bearer.

A third aspect of the embodiments of the present application provides a method for accessing a local network, where the method includes:

connecting, by an eNB, UE and a core network, where a gateway of the core network is a C-GW;

establishing, by the eNB for the UE, a user plane bearer that is from the eNB to the C-GW and that includes a local gateway, corresponding to the UE, used as an intermediate node, where the local gateway is a gateway of a local network; and when the eNB receives data used by the UE to access the local network, sending, by the eNB to the local gateway, the data used to access the local network.

After establishing, for the UE, the user plane bearer in which the local gateway is used as the intermediate node, the eNB can send, to the local gateway, the received data used by the UE to access the local network, so that an operator network and the local network are simultaneously accessed.

With reference to the third aspect of the embodiments of the present application, in a first implementation of the third aspect of the embodiments of the present application, before the step of establishing, by the eNB for the UE, a user plane bearer that is from the eNB to the C-GW and that includes a local gateway, corresponding to the UE, used as an intermediate node, the method further includes:

determining, by the eNB, the local gateway or a subnet corresponding to the UE; and notifying, by the eNB, an MME of the determined local gateway or subnet corresponding to the UE.

The eNB determines the local gateway or the subnet corresponding to the UE and then notifies the MME, so as to relieve operation load of the MME.

With reference to the third aspect or the first implementation of the third aspect of the embodiments of the present application, in a second implementation of the third aspect of the embodiments of the present application, the establishing, by the eNB for the UE, a user plane bearer that is from the eNB to the C-GW and that includes a local gateway, corresponding to the UE, used as an intermediate node specifically includes:

obtaining, by the eNB, an IP address and an end point identifier of a tunnel from the eNB to the local gateway that are assigned by the local gateway to a user plane of the UE; and assigning, by the eNB to the user plane of the UE, an IP address and an end point identifier of a tunnel from the local gateway to the eNB, and sending, to the MME, the IP address and the end point identifier of the tunnel from the local gateway to the eNB that are assigned by the eNB.

The IP addresses and the end point identifiers of the tunnels are obtained and assigned, so as to ensure smooth establishment and stability of the user plane bearer.

A fourth aspect of the embodiments of the present application provides an MME, including:

a first receiving module, configured to receive an access request of user equipment UE that is sent by a base station eNB, where the access request carries access information of the UE; and a first processing module, configured to: determine, according to the access information of the UE, a first local gateway corresponding to the UE, where the first local gateway is a gateway of a first local network; and establish, for the UE, a user plane bearer that is from the eNB to a gateway C-GW of a core network and that includes the first local gateway used as an intermediate node.

With reference to the fourth aspect of the embodiments of the present application, in a first implementation of the fourth aspect of the embodiments of the present application, before determining, according to the access information of the UE, the first local gateway corresponding to the UE, the first processing module is further configured to: obtain function information of the eNB; determine, according to the function information of the eNB, whether the eNB supports a local gateway connection; and when determining that the eNB supports the local gateway connection, trigger the step of determining the first local gateway corresponding to the UE.

With reference to the fourth aspect or the first implementation of the fourth aspect of the embodiments of the present application, in a second implementation of the fourth aspect of the embodiments of the present application, the access information includes the UE identifier, the UE identifier is used to uniquely identify the UE, and when determining, according to the access information of the UE, the first local gateway corresponding to the UE, the first processing module is specifically configured to search, according to the UE identifier, a user management server for the first local gateway corresponding to the UE.

With reference to the second implementation of the fourth aspect of the embodiments of the present application, in a third implementation of the fourth aspect of the embodiments of the present application, the first local gateway is a local gateway having a highest priority in multiple local gateways corresponding to the UE.

With reference to the first implementation of the fourth aspect of the embodiments of the present application, in a fourth implementation of the fourth aspect of the embodiments of the present application, the function information of the eNB further includes information about a local gateway accessed by the eNB, the access information includes the UE identifier, and the UE identifier is used to uniquely identify the UE; and when determining, according to the access information of the UE, the first local gateway corresponding to the UE, the first processing module is specifically configured to determine, according to the information about the local gateway accessed by the eNB and the UE identifier, the first local gateway corresponding to the UE.

With reference to any one of the second implementation to the fourth implementation of the fourth aspect of the embodiments of the present application, in a fifth implementation of the fourth aspect of the embodiments of the present application, after the first processing module establishes, for the UE, the user plane bearer that is from the eNB to the C-GW and that includes the first local gateway used as the intermediate node, the first processing module is further configured to: when determining that a local gateway corresponding to the UE is updated to a third local gateway, establish, for the UE, a user plane bearer that is from the eNB to the C-GW and that includes the third local gateway used as an intermediate node, where the third local gateway is a gateway of a third local network.

With reference to any one of the second implementation to the fourth implementation of the fourth aspect of the embodiments of the present application, in a sixth implementation of the fourth aspect of the embodiments of the present application, the first processing module is further configured to obtain, according to the UE identifier, a first subnet corresponding to the UE, where the first subnet is located in the first local network; and the MME further includes:

a first sending module, configured to send a first routing instruction to the first local gateway, where the first routing instruction includes an identifier of the first subnet and the UE identifier, and the first routing instruction is used to instruct to route, to the first subnet, data used by the UE to access the first local network.

With reference to the sixth implementation of the fourth aspect of the embodiments of the present application, in a seventh implementation of the fourth aspect of the embodiments of the present application, when obtaining, according to the UE identifier, the first subnet corresponding to the UE, the first processing module is specifically configured to: determine, according to the UE identifier, a user group corresponding to the UE; and determine, according to location information of the UE and/or a current time and the user group, the first subnet corresponding to the UE.

With reference to the sixth implementation or the seventh implementation of the fourth aspect of the embodiments of the present application, in an eighth implementation of the fourth aspect of the embodiments of the present application, after the first processing module establishes, for the UE, the user plane bearer that is from the eNB to the gateway C-GW of the core network and that includes the first local gateway used as the intermediate node, the first processing module is further configured to: determine that a subnet corresponding to the UE is updated to a third subnet; determine that the third subnet is located in a second local network, wherein the second local network is different from the first local network; determine that a gateway of the second local network is a second local gateway; and establish, for the UE, a user plane bearer that is from the eNB to the C-GW and that includes the second local gateway used as an intermediate node.

With reference to the eighth implementation of the fourth aspect of the embodiments of the present application, in a ninth implementation of the fourth aspect of the embodiments of the present application, after the first processing module determines that the gateway of the second local network is the second local gateway, the first sending module is further configured to send a third routing instruction to the second local gateway, where the third routing instruction includes an identifier of the third subnet and the UE identifier, and the routing instruction is used to instruct to route, to the third subnet, data used by the UE to access the second local network.

With reference to any one of the second implementation to the ninth implementation of the fourth aspect of the embodiments of the present application, in a tenth implementation of the fourth aspect of the embodiments of the present application, after establishing, for the UE, the user plane bearer that is from the eNB to the C-GW and that includes the local gateway used as the intermediate node, the first processing module is further configured to: obtain, according to the UE identifier, a network name of the subnet corresponding to the UE; and send the network name to the UE by using a non-access stratum NAS message, so that the UE displays the network name on a user interface.

With reference to any one of the sixth implementation to the tenth implementation of the fourth aspect of the embodiments of the present application, in an eleventh implementation of the fourth aspect of the embodiments of the present application, the first sending module is further configured to notify the C-GW of the subnet currently corresponding to the UE;

the first receiving module is further configured to receive a domain name system server address that is assigned to the subnet corresponding to the UE and that is returned by the C-GW, where a domain name system server identified by the domain name system server address stores a correspondence between a domain name and an IP address of a network device in the subnet corresponding to the UE; and the first sending module is further configured to send, to the UE, the domain name system server address assigned to the subnet corresponding to the UE.

With reference to any one of the fourth aspect to the eleventh implementation of the fourth aspect of the embodiments of the present application, in a twelfth implementation of the fourth aspect of the embodiments of the present application, the first sending module is further configured to notify the C-GW of a local network currently corresponding to the UE;

the first receiving module is further configured to receive a domain name system server address that is assigned to the local network corresponding to the UE and that is returned by the C-GW, where a domain name system server identified by the domain name system server address stores a correspondence between a domain name and an IP address of a network device in the local network corresponding to the UE; and the first sending module is further configured to send, to the UE, the domain name system server address assigned to the local network corresponding to the UE.

With reference to any one of the fourth aspect to the twelfth implementation of the fourth aspect of the embodiments of the present application, in a thirteenth implementation of the fourth aspect of the embodiments of the present application, when establishing, for the UE, the user plane bearer that is from the eNB to the gateway C-GW of the core network and that includes the first local gateway used as the intermediate node, the first processing module is specifically configured to: control the first receiving module to obtain an IP address and an end point identifier of a tunnel from the local gateway to the C-GW that are assigned by the C-GW, and control the first sending module to send, to the local gateway, the IP address and the end point identifier of the tunnel from the local gateway to the C-GW that are assigned by the C-GW; control the first receiving module to obtain an IP address and an end point identifier of a tunnel from the local gateway to the eNB that are assigned by the eNB, and control the first sending module to send, to the local gateway, the IP address and the end point identifier of the tunnel from the local gateway to the eNB that are assigned by the eNB; and control the first receiving module to obtain an IP address and an end point identifier of a tunnel from the C-GW to the local gateway that are assigned by the local gateway and an IP address and an end point identifier of a tunnel from the eNB to the local gateway that are assigned by the local gateway, and control the first sending module to send, to the C-GW, the IP address and the end point identifier of the tunnel from the C-GW to the local gateway that are assigned by the local gateway, and to send, to the eNB, the IP address and the end point identifier of the tunnel from the eNB to the local gateway that are assigned by the local gateway.

A fifth aspect of the embodiments of the present application provides a local gateway, including:

a second receiving module, configured to receive a user plane establishment request sent by a mobility management entity MME, where the user plane establishment request includes information about a user plane bearer that is established by a gateway C-GW of a core network for UE and that is from the local gateway to the C-GW, the UE accesses the core network by using an eNB, and the local gateway is a local gateway corresponding to the UE; and a second processing module, configured to establish, for the UE according to the user plane establishment request, a user plane bearer that is from the eNB to the C-GW and that includes the local gateway used as an intermediate node.

With reference to the fifth aspect of the embodiments of the present application, in a first implementation of the fifth aspect of the embodiments of the present application, the second processing module is further configured to determine whether received data used by the UE to access a network is data used to access the local network; and the local gateway further includes:

a second sending module, configured to: when it is determined that the data used by the UE to access a network is the data used to access the local network, route, to the local network, the data used by the UE to access a network; or when it is determined that the data used by the UE to access a network is not the data used to access the local network, forward, to the C-GW, the data used by the UE to access a network.

With reference to the first implementation of the fifth aspect of the embodiments of the present application, in a second implementation of the fifth aspect of the embodiments of the present application, after the second processing module establishes, for the UE according to the user plane establishment request, the user plane bearer that is from the eNB to the C-GW and that includes the local gateway used as the intermediate node, and before the second sending module routes, to the local network, the data used by the UE to access a network, the second processing module is further configured to determine, according to a UE identifier, a subnet corresponding to the UE, where the UE identifier is used to uniquely identify the UE, and the user plane establishment request includes the UE identifier; and when routing, to the local network, the data used by the UE to access a network, the second sending module is specifically configured to route, to the subnet corresponding to the UE, the data used by the UE to access a network.

With reference to the first implementation of the fifth aspect of the embodiments of the present application, in a third implementation of the fifth aspect of the embodiments of the present application, after the second processing module establishes, for the UE according to the user plane establishment request, the user plane bearer that is from the eNB to the C-GW and that includes the local gateway used as the intermediate node, and before the second sending module routes, to the local network, the data used by the UE to access a network, the second receiving module is further configured to receive a routing instruction sent by the MME, where the routing instruction includes a subnet identifier and a UE identifier, the UE identifier is used to uniquely identify the UE, and the subnet identifier is used to uniquely identify a subnet; and when routing, to the local network, the data used by the UE to access a network, the second sending module is specifically configured to route, according to the routing instruction to the subnet identified by the subnet identifier in the routing instruction, the data used by the UE to access a network.

With reference to any one of the first implementation to the third implementation of the fifth aspect of the embodiments of the present application, in a fourth implementation of the fifth aspect of the embodiments of the present application, when determining whether the received data used by the UE to access a network is the data used to access the local network, the second processing module is specifically configured to: when the data used by the UE to access a network is received, determine, according to a destination IP address of the data used by the UE to access a network, whether the data used by the UE to access a network is the data used to access the local network, where the local gateway stores a list of an IP address of a network device in the local network.

With reference to any one of the fifth aspect to the fourth implementation of the fifth aspect of the embodiments of the present application, in a fifth implementation of the fifth aspect of the embodiments of the present application, when receiving the user plane establishment request sent by the mobility management entity MME, the second receiving module is specifically configured to obtain an IP address and an end point identifier of a tunnel from the local gateway to the C-GW that are assigned by the C-GW to a user plane of the UE; and when establishing, for the UE according to the user plane establishment request, the user plane bearer that is from the eNB to the C-GW and that includes the local gateway used as the intermediate node, the second processing module is specifically configured to: assign, to the user plane of the UE, an IP address and an end point identifier of a tunnel from the C-GW to the local gateway and an IP address and an end point identifier of a tunnel from the eNB to the local gateway; and control the second sending module to send, to the MME, the IP address and the end point identifier of the tunnel from the C-GW to the local gateway that are assigned by the second processing module and the IP address and the end point identifier of the tunnel from the eNB to the local gateway that are assigned by the second processing module.

A sixth aspect of the embodiments of the present application provides an base station eNB, including:

a third processing module, configured to: connect UE and a core network, where a gateway of the core network is a C-GW; and establish, for the UE, a user plane bearer that is from the eNB to the C-GW and that includes a local gateway, corresponding to the UE, used as an intermediate node, where the local gateway is a gateway of a local network;

a third receiving module, configured to receive data used by the UE to access the local network; and a third sending module, configured to: when the data used by the UE to access the local network is received, send, to the local gateway, the data used to access the local network.

With reference to the sixth aspect of the embodiments of the present application, in a first implementation of the sixth aspect of the embodiments of the present application, before establishing, for the UE, the user plane bearer that is from the eNB to the C-GW and that includes the local gateway, corresponding to the UE, used as the intermediate node, the third processing module is further configured to determine the local gateway or a subnet corresponding to the UE; and the third sending module is further configured to notify an MME of the determined local gateway or subnet corresponding to the UE.

With reference to the sixth aspect or the first implementation of the sixth aspect of the embodiments of the present application, in a second implementation of the sixth aspect of the embodiments of the present application, when establishing, for the UE, the user plane bearer that is from the eNB to the C-GW and that includes the local gateway, corresponding to the UE, used as the intermediate node, the third processing module is specifically configured to: control the third receiving module to obtain an IP address and an end point identifier of a tunnel from the eNB to the local gateway that are assigned by the local gateway to a user plane of the UE; assign, to the user plane of the UE, an IP address and an end point identifier of a tunnel from the local gateway to the eNB; and control the third sending module to send, to the MME, the IP address and the end point identifier of the tunnel from the local gateway to the eNB that are assigned by the third processing module.

A seventh aspect of the embodiments of the present application provides an MME, including:

an input apparatus, an output apparatus, a processor, and a memory, where the processor is configured to perform the following steps by invoking an operation instruction stored in the memory:

instructing the input apparatus to receive an access request of user equipment UE that is sent by a base station eNB, where the access request carries access information of the UE;

determining, according to the access information of the UE, a first local gateway corresponding to the UE, where the first local gateway is a gateway of a first local network; and establishing, for the UE, a user plane bearer that is from the eNB to a gateway C-GW of a core network and that includes the first local gateway used as an intermediate node.

With reference to the seventh aspect of the embodiments of the present application, in a first implementation of the seventh aspect of the embodiments of the present application, before performing the step of determining, according to the access information of the UE, a first local gateway corresponding to the UE, the processor is further configured to perform the following steps:

obtaining function information of the eNB;

determining, according to the function information of the eNB, whether the eNB supports a local gateway connection; and when determining that the eNB supports the local gateway connection, triggering the step of determining, according to the access information of the UE, a first local gateway corresponding to the UE.

With reference to the seventh aspect or the first implementation of the seventh aspect of the embodiments of the present application, in a second implementation of the seventh aspect of the embodiments of the present application, the access information includes the UE identifier, the UE identifier is used to uniquely identify the UE, and when performing the step of determining, according to the access information of the UE, a first local gateway corresponding to the UE, the processor specifically performs the following step:

searching, according to the UE identifier, a user management server for the first local gateway corresponding to the UE.

With reference to the second implementation of the seventh aspect of the embodiments of the present application, in a third implementation of the seventh aspect of the embodiments of the present application, the first local gateway is a local gateway having a highest priority in multiple local gateways corresponding to the UE.

With reference to the first implementation of the seventh aspect of the embodiments of the present application, in a fourth implementation of the seventh aspect of the embodiments of the present application, the function information of the eNB further includes information about a local gateway accessed by the eNB, the access information includes the UE identifier, and the UE identifier is used to uniquely identify the UE; and when performing the step of determining, according to the access information of the UE, a first local gateway corresponding to the UE, the processor specifically performs the following step:

determining, according to the information about the local gateway accessed by the eNB and the UE identifier, the first local gateway corresponding to the UE.

With reference to any one of the second implementation to the fourth implementation of the seventh aspect of the embodiments of the present application, in a fifth implementation of the seventh aspect of the embodiments of the present application, after performing the step of establishing, for the UE, a user plane bearer that is from the eNB to the C-GW and that includes the first local gateway used as an intermediate node, the processor is further configured to perform the following step:

when determining that a local gateway corresponding to the UE is updated to a third local gateway, establishing, for the UE, a user plane bearer that is from the eNB to the C-GW and that includes the third local gateway used as an intermediate node, where the third local gateway is a gateway of a third local network.

With reference to any one of the second implementation to the fourth implementation of the seventh aspect of the embodiments of the present application, in a sixth implementation of the seventh aspect of the embodiments of the present application, the processor is further configured to perform the following steps:

obtaining, according to the UE identifier, a first subnet corresponding to the UE, where the first subnet is located in the first local network; and sending a first routing instruction to the first local gateway, where the first routing instruction includes an identifier of the first subnet and the UE identifier, and the first routing instruction is used to instruct to route, to the first subnet, data used by the UE to access the first local network.

With reference to the sixth implementation of the seventh aspect of the embodiments of the present application, in a seventh implementation of the seventh aspect of the embodiments of the present application, when performing the step of obtaining, according to the UE identifier, a first subnet corresponding to the UE, the processor specifically performs the following steps:

determining, according to the UE identifier, a user group corresponding to the UE; and determining, according to location information of the UE and/or a current time and the user group, the first subnet corresponding to the UE.

With reference to the sixth implementation or the seventh implementation of the seventh aspect of the embodiments of the present application, in an eighth implementation of the seventh aspect of the embodiments of the present application, after performing the step of establishing, for the UE, a user plane bearer that is from the eNB to a gateway C-GW of a core network and that includes the first local gateway used as an intermediate node, the processor is further configured to perform the following steps:

determining that a subnet corresponding to the UE is updated to a third subnet;

determining that the third subnet is located in a second local network, wherein the second local network is different from the first local network;

determining that a gateway of the second local network is a second local gateway; and establishing, for the UE, a user plane bearer that is from the eNB to the C-GW and that includes the second local gateway used as an intermediate node.

With reference to the eighth implementation of the seventh aspect of the embodiments of the present application, in a ninth implementation of the seventh aspect of the embodiments of the present application, after performing the step of determining that a gateway of the second local network is a second local gateway, the processor is further configured to perform the following step:

instructing the output apparatus to send a third routing instruction to the second local gateway, where the third routing instruction includes an identifier of the third subnet and the UE identifier, and the routing instruction is used to instruct to route, to the third subnet, data used by the UE to access the second local network.

With reference to any one of the second implementation to the ninth implementation of the seventh aspect of the embodiments of the present application, in a tenth implementation of the seventh aspect of the embodiments of the present application, after performing the step of establishing, for the UE, a user plane bearer that is from the eNB to the C-GW and that includes the local gateway used as an intermediate node, the processor is further configured to perform the following steps:

obtaining, according to the UE identifier, a network name of the subnet corresponding to the UE; and sending the network name to the UE by using a non-access stratum NAS message, so that the UE displays the network name on a user interface.

With reference to any one of the sixth implementation to the tenth implementation of the seventh aspect of the embodiments of the present application, in an eleventh implementation of the seventh aspect of the embodiments of the present application, the processor is further configured to perform the following steps:

notifying the C-GW of the subnet currently corresponding to the UE;

receiving a domain name system server address that is assigned to the subnet corresponding to the UE and that is returned by the C-GW, where a domain name system server identified by the domain name system server address stores a correspondence between a domain name and an IP address of a network device in the subnet corresponding to the UE; and sending, to the UE, the domain name system server address assigned to the subnet corresponding to the UE.

With reference to any one of the seventh aspect to the eleventh implementation of the seventh aspect of the embodiments of the present application, in a twelfth implementation of the seventh aspect of the embodiments of the present application, the processor is further configured to perform the following steps:

notifying the C-GW of a local network currently corresponding to the UE;

receiving a domain name system server address that is assigned to the local network corresponding to the UE and that is returned by the C-GW, where a domain name system server identified by the domain name system server address stores a correspondence between a domain name and an IP address of a network device in the local network corresponding to the UE; and sending, to the UE, the domain name system server address assigned to the local network corresponding to the UE.

With reference to any one of the seventh aspect to the twelfth implementation of the seventh aspect of the embodiments of the present application, in a thirteenth implementation of the seventh aspect of the embodiments of the present application, when performing the step of establishing, for the UE, a user plane bearer that is from the eNB to a gateway C-GW of a core network and that includes the first local gateway used as an intermediate node, the processor specifically performs the following steps:

instructing the input apparatus to obtain an IP address and an end point identifier of a tunnel from the local gateway to the C-GW that are assigned by the C-GW, and instructing the output apparatus to send, to the local gateway, the IP address and the end point identifier of the tunnel from the local gateway to the C-GW that are assigned by the C-GW;

instructing the input apparatus to obtain an IP address and an end point identifier of a tunnel from the local gateway to the eNB that are assigned by the eNB, and instructing the output apparatus to send, to the local gateway, the IP address and the end point identifier of the tunnel from the local gateway to the eNB that are assigned by the eNB; and instructing the input apparatus to obtain an IP address and an end point identifier of a tunnel from the C-GW to the local gateway that are assigned by the local gateway and an IP address and an end point identifier of a tunnel from the eNB to the local gateway that are assigned by the local gateway, and instructing the output apparatus to send, to the C-GW, the IP address and the end point identifier of the tunnel from the C-GW to the local gateway that are assigned by the local gateway, and to send, to the eNB, the IP address and the end point identifier of the tunnel from the eNB to the local gateway that are assigned by the local gateway.

An eighth aspect of the embodiments of the present application provides a local gateway, including:

an input apparatus, an output apparatus, a processor, and a memory, where the processor is configured to perform the following steps by invoking an operation instruction stored in the memory:

instructing the input apparatus to receive a user plane establishment request sent by a mobility management entity MME, where the user plane establishment request includes information about a user plane bearer that is established by a gateway C-GW of a core network for UE and that is from the local gateway to the C-GW, the UE accesses the core network by using an eNB, and the local gateway is a local gateway corresponding to the UE; and establishing, for the UE according to the user plane establishment request, a user plane bearer that is from the eNB to the C-GW and that includes the local gateway used as an intermediate node.

With reference to the eighth aspect of the embodiments of the present application, in a first implementation of the eighth aspect of the embodiments of the present application, the processor is further configured to perform the following steps:

determining whether received data used by the UE to access a network is data used to access the local network; and when determining that the data used by the UE to access a network is the data used to access the local network, instructing the output apparatus to route, to the local network, the data used by the UE to access a network; or when determining that the data used by the UE to access a network is not the data used to access the local network, instructing the output apparatus to forward, to the C-GW, the data used by the UE to access a network.

With reference to the first implementation of the eighth aspect of the embodiments of the present application, in a second implementation of the eighth aspect of the embodiments of the present application, after performing the step of establishing, for the UE according to the user plane establishment request, a user plane bearer that is from the eNB to the C-GW and that includes the local gateway used as an intermediate node, and before performing the step of routing, to the local network, the data used by the UE to access a network, the processor is further configured to perform the following step:

determining, according to a UE identifier, a subnet corresponding to the UE, where the UE identifier is used to uniquely identify the UE, and the user plane establishment request includes the UE identifier; and when performing the step of routing, to the local network, the data used by the UE to access a network, the processor specifically performs the following step:

routing, to the subnet corresponding to the UE, the data used by the UE to access a network.

With reference to the first implementation of the eighth aspect of the embodiments of the present application, in a third implementation of the eighth aspect of the embodiments of the present application, after performing the step of establishing, for the UE according to the user plane establishment request, a user plane bearer that is from the eNB to the C-GW and that includes the local gateway used as an intermediate node, and before performing the step of routing, to the local network, the data used by the UE to access a network, the processor is further configured to perform the following step:

instructing the input apparatus to receive a routing instruction sent by the MME, where the routing instruction includes a subnet identifier and a UE identifier, the UE identifier is used to uniquely identify the UE, and the subnet identifier is used to uniquely identify a subnet; and when performing the step of routing, to the local network, the data used by the UE to access a network, the processor specifically performs the following step:

routing, according to the routing instruction to the subnet identified by the subnet identifier in the routing instruction, the data used by the UE to access a network.

With reference to any one of the first implementation to the third implementation of the eighth aspect of the embodiments of the present application, in a fourth implementation of the eighth aspect of the embodiments of the present application, when performing the step of determining whether received data used by the UE to access a network is data used to access the local network, the processor specifically performs the following step:

when the data used by the UE to access a network is received, determining, according to a destination IP address of the data used by the UE to access a network, whether the data used by the UE to access a network is the data used to access the local network, where the memory stores a list of an IP address of a network device in the local network.

With reference to the eighth aspect to the fourth implementation of the eighth aspect of the embodiments of the present application, in a fifth implementation of the eighth aspect of the embodiments of the present application, when performing the step of instructing the input apparatus to receive a user plane establishment request sent by a mobility management entity MME, the processor specifically performs the following step:

instructing the input apparatus to obtain an IP address and an end point identifier of a tunnel from the local gateway to the C-GW that are assigned by the C-GW to a user plane of the UE; and when performing the step of establishing, for the UE according to the user plane establishment request, a user plane bearer that is from the eNB to the C-GW and that includes the local gateway used as an intermediate node, the processor specifically performs the following steps:

assigning, to the user plane of the UE, an IP address and an end point identifier of a tunnel from the C-GW to the local gateway and an IP address and an end point identifier of a tunnel from the eNB to the local gateway; and instructing the output apparatus to send, to the MME, the assigned IP address and end point identifier of the tunnel from the C-GW to the local gateway and the assigned IP address and end point identifier of the tunnel from the eNB to the local gateway.

A ninth aspect of the embodiments of the present application provides an base station eNB, including:

an input apparatus, an output apparatus, a processor, and a memory, where the processor is configured to perform the following operations by invoking an operation instruction stored in the memory:

connecting UE and a core network, where a gateway of the core network is a C-GW;

establishing, for the UE, a user plane bearer that is from the eNB to the C-GW and that includes a local gateway, corresponding to the UE, used as an intermediate node, where the local gateway is a gateway of a local network; and when the input apparatus receives data used by the UE to access the local network, instructing the output apparatus to send, to the local gateway, the data used to access the local network.

With reference to the ninth aspect of the embodiments of the present application, in a first implementation of the ninth aspect of the embodiments of the present application, before the processor performs the step of establishing, for the UE, a user plane bearer that is from the eNB to the C-GW and that includes a local gateway, corresponding to the UE, used as an intermediate node, the processor is further configured to perform the following steps:

determining the local gateway or a subnet corresponding to the UE; and instructing the output apparatus to notify an MME of the determined local gateway or subnet corresponding to the UE.

With reference to the ninth aspect or the first implementation of the ninth aspect of the embodiments of the present application, in a second implementation of the ninth aspect of the embodiments of the present application, when performing the step of establishing, for the UE, a user plane bearer that is from the eNB to the C-GW and that includes a local gateway, corresponding to the UE, used as an intermediate node, the processor specifically performs the following steps:

instructing the input apparatus to obtain an IP address and an end point identifier of a tunnel from the eNB to the local gateway that are assigned by the local gateway to a user plane of the UE;

assigning, to the user plane of the UE, an IP address and an end point identifier of a tunnel from the local gateway to the eNB; and instructing the output apparatus to send, to the MME, the assigned IP address and end point identifier of the tunnel from the local gateway to the eNB.

A tenth aspect of the embodiments of the present application provides a system for accessing a local network, including:

the MME according to any one of the fourth aspect to the thirteenth implementation of the fourth aspect of the embodiments of the present application or any one of the seventh aspect to the thirteenth implementation of the seventh aspect of the embodiments of the present application, the local gateway according to any one of the fifth aspect to the fifth implementation of the fifth aspect of the embodiments of the present application or any one of the eighth aspect to the fifth implementation of the eighth aspect of the embodiments of the present application, the base station according to any one of the sixth aspect to the second implementation of the sixth aspect of the embodiments of the present application or any one of the ninth aspect to the second implementation of the ninth aspect of the embodiments of the present application, and UE.

With reference to the tenth aspect of the embodiments of the present application, in a first implementation of the tenth aspect of the embodiments of the present application, the system further includes:

a user management server, configured to store a correspondence between the UE and a subnet and/or a local gateway; and a domain name system server, configured to: store a correspondence between a domain name and an IP address of a network device in a subnet corresponding to the UE, and covert a domain name of a service server in the subnet corresponding to the UE to an IP address of the service server.

It can be learned from the technical solutions that the embodiments of the present application have the following advantages: In the embodiments of the present application, the mobility management entity MME in the core network can determine, according to the access information of the user equipment UE that is carried in the access request of the UE that is sent by the base station eNB, the first local gateway corresponding to the UE, where the first local gateway is the gateway of the first local network; and establish, for the UE, the user plane bearer that is from the eNB to the gateway C-GW of the core network and that includes the first local gateway used as the intermediate node. In this way, because the first local gateway is used as the intermediate node in the user plane bearer, a data connection is established between the eNB and each of the gateway C-GW of the core network and the gateway of the first local network. The UE can access not only the operator network but also the first local network by using the eNB, so that the user equipment can simultaneously access the operator network and the local network.

DESCRIPTION OF EMBODIMENTS

The following clearly describes the technical solutions in the embodiments of the present application with reference to the accompanying drawings in the embodiments of the present application. Apparently, the described embodiments are merely some but not all of the embodiments of the present application. All other embodiments obtained by persons skilled in the art based on the embodiments of the present application without creative efforts shall fall within the protection scope of the present application.

The embodiments of the present application provide a method for accessing a local network, and a related device, so that a user equipment can simultaneously use an operator network and a local network.

Figure 1:
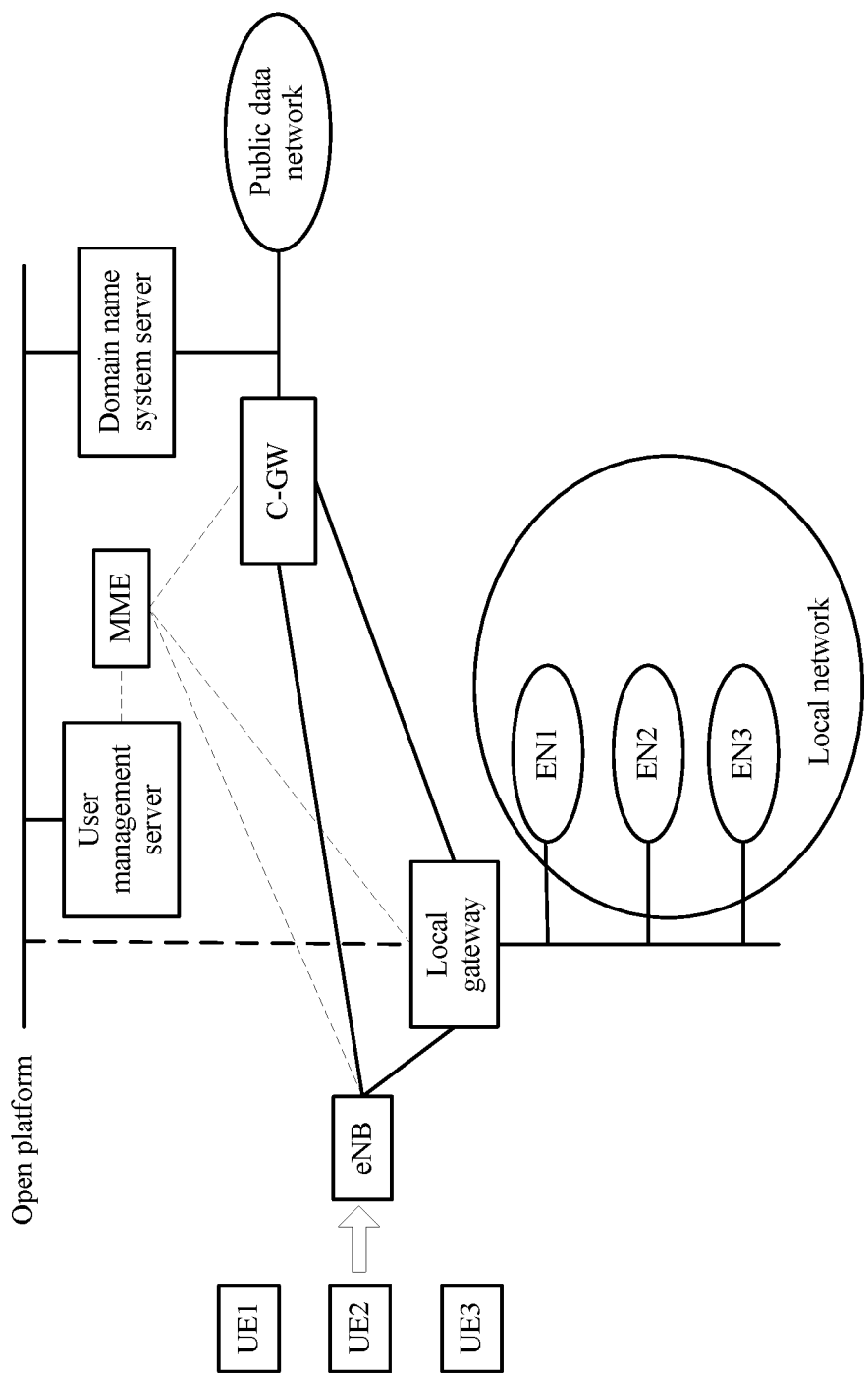
FIG. 1 is a schematic architectural diagram of a network system according to an embodiment of the present application.

It should be noted that in the embodiments of the present application, the method for accessing a local network is applied to a network system. As shown in FIG. 1, FIG. 1 is a schematic architectural diagram of a network system according to an embodiment of the present application. In order that a user accesses an operator network, a user plane bearer from a base station eNB to a gateway C-GW of a core network needs to be established for user equipment UE, so that information sent by the UE is sent to the core network by using the eNB and the C-GW. Therefore, network devices in the network system are the UE, the eNB, and the core network. The core network includes the gateway C-GW of the core network and a mobility management entity MME of the core network.

In addition, a user management server (which may be configured on a CSG server or another device) configured to store necessary user information and a correspondence between the user information and other information or a domain name system server DNS server configured to perform domain name resolution may exist in the network system. A message sent by the UE may be sent to a public data network PDN Internet by using the C-GW and the DNS server. To configure a server such as the user management server or the DNS server, the network system may further include an open platform, Open Platform. In the software industry and a network, an open platform means that a software system allows, by opening an application programming interface (API) or a function of the software system, an external program to use a function of the software system or use a resource of the software system, without a need to modify source code of the software system.

Further, in this embodiment of the present application, the information about the UE needs to be sent to a local network, so that the user equipment can simultaneously access the operator network and the local network. Therefore, the network system further includes the local network. The local network includes a local gateway L-GW of the local network and a subnet that may exist in the local network, as indicated by EN1, EN2, and EN3 in FIG. 1.

It may be understood that, in this embodiment of the present application, in a communication process, each of the MME, the eNB, and the local gateway may obtain a UE identifier that uniquely identifies UE, and may search for a correspondence according to the UE identifier to obtain required information (for example, a corresponding local gateway, a corresponding user group, and a corresponding subnet). For example, the UE identifier may be an MSISDN, a temporary identifier, or any other identifier that can be used to identify a UE. The MSISDN is a number that a calling user needs to dial to call a mobile subscriber in a Global System for Mobile Communications public land mobile network (GSM PLMN), functions the same as a public switched telephone network (PSTN) number, and is a unique number that can be recognized in a numbering plan of a public switched telephone network. In addition, in actual application, another identifier that can be obtained by each of the MME, the eNB, and the local gateway and can uniquely identify UE may be used as the UE identifier. This is not limited herein.

Figure 2:
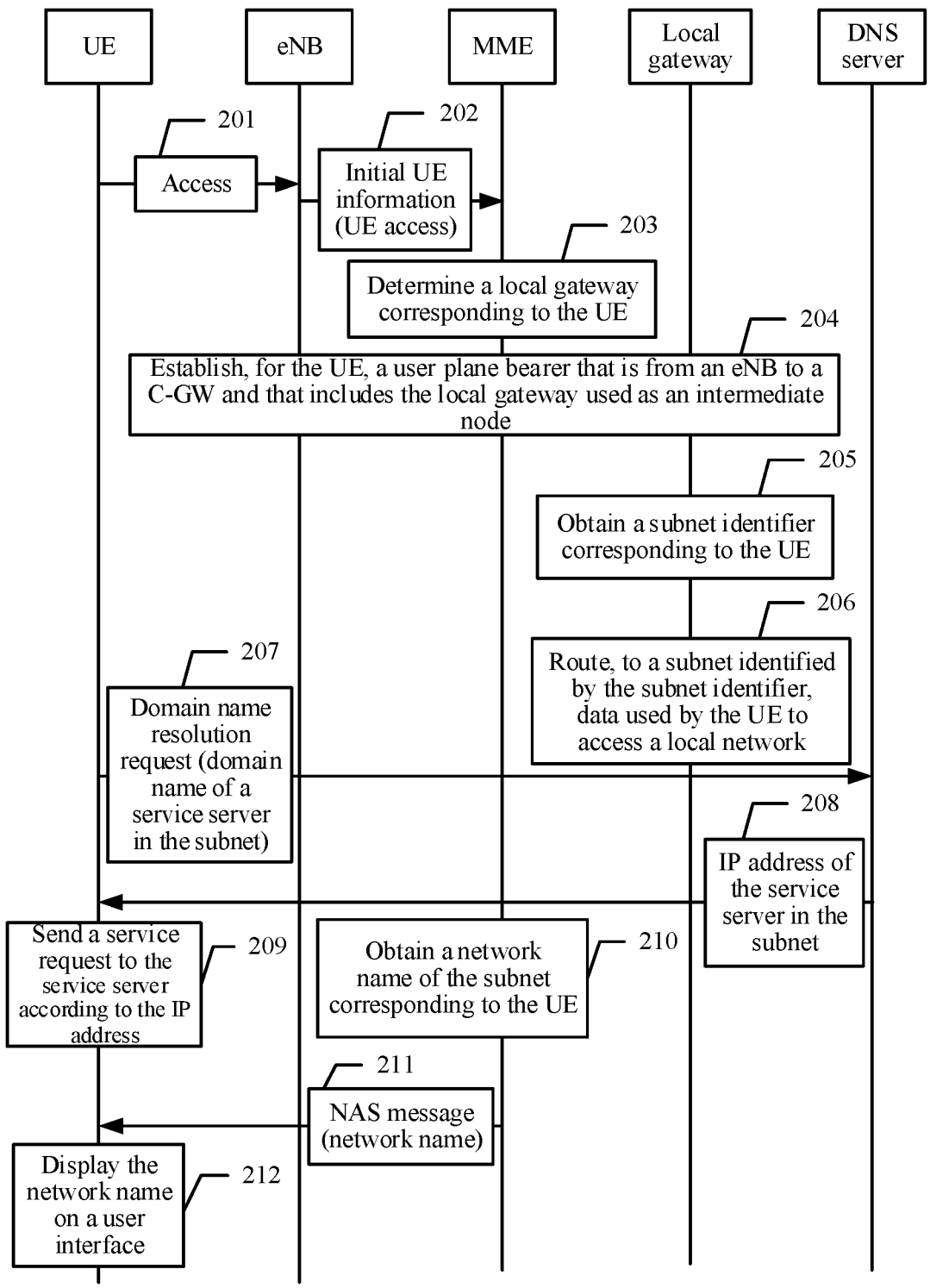
FIG. 2 is a schematic diagram of signaling exchange in a method for accessing a local network according to an embodiment of the present application.

Referring to FIG. 2, with reference to the network system shown in FIG. 1, the following describes a method for accessing a local network in an embodiment of the present application from a perspective of signaling exchange between network devices.

201. UE accesses an eNB.

202. The eNB sends access information of the UE to an MME by using an initial UE information (initial UE Message).

It may be understood that the access information of the UE is carried in an access request sent by the UE by using the eNB.

203. After obtaining the access information, the MME determines a local gateway corresponding to the UE.

It may be understood that the access information includes a UE identifier used to uniquely identify the UE, such as an MSISDN, a temporary UE identifier, or any other identifier that can be used to identify a UE. The MME or a user management server (for example, a CSG server or another device) stores a correspondence between the UE identifier and the local gateway. Specifically, the MME may determine the local gateway in the following manners.

1. The MME searches for the correspondence according to the UE identifier in the access information, to obtain the local gateway corresponding to the UE.

2. The MME may learn, by obtaining function information of the eNB, of one or more local gateways connected to the eNB, and the MME may obtain, according to the UE identifier in the access information and information about the local gateway accessed by the eNB, the local gateway corresponding to the UE. Specifically, the function information of the eNB may be sent by the eNB to the MME, or may be obtained by the MME in another manner, for example, obtained from a database by querying the eNB, a local network identifier, a local gateway identifier, or the like by using a DNS server. This is not limited herein.

Optionally, if the eNB is connected to one local gateway, a specific manner in which the MME may obtain, according to the UE identifier in the access information and information about the local gateway accessed by the eNB, the local gateway corresponding to the UE may be as follows: If the MME learns, according to the UE identifier, that the user supports a local network, the MME may determine that the local gateway connected to the eNB is the local gateway corresponding to the UE.

Optionally, if the eNB is connected to multiple local gateways, a specific manner in which the MME may obtain, according to the UE identifier in the access information and information about the local gateway accessed by the eNB, the local gateway corresponding to the UE may be as follows: If the MME obtains two local gateways by searching for the correspondence according to the UE identifier, and one of the two local gateways is the local gateway accessed by the eNB, the MME may determine that the local gateway is the local gateway corresponding to the UE.

3. The eNB may search for the correspondence and/or information about an accessed local gateway according to the UE identifier, to obtain the local gateway corresponding to the UE; and then send the local gateway to the MME. This is not limited herein.

204. The MME, the eNB, and the local gateway corresponding to the UE establish, for the UE, a user plane bearer that is from the eNB to a C-GW and that includes the local gateway used as an intermediate node.

It may be understood that the user plane bearer that includes the local gateway used as the intermediate node means that: A user plane data channel (which may be, for example, a PDN data channel or another data channel, and is not limited herein) for accessing core network and Internet services by using the C-GW is established between the eNB and the C-GW, and the local gateway is used as the intermediate node. On an eNB side, the eNB is connected to the local gateway. On a C-GW side, the local gateway is connected to the C-GW. A data flow used by the user equipment to access the core network and Internet services is forwarded by the L-GW between the eNB and the C-GW. Data used by the user equipment to access a service of the local network is locally routed by the L-GW to the local network. For a specific procedure, refer to a description in a subsequent embodiment.

In step 201 to step 204, the user plane bearer that is from the eNB to the C-GW and that includes the local gateway used as the intermediate node is established for the UE, so that the user equipment can simultaneously access an operator network and the local network.

Optionally, step 205 and step 206 may be further included in another embodiment of the method for accessing a local network in this embodiment of the present application. Data used by the UE to access the local network is routed to a specific subnet corresponding to the UE in the local network, so that a data access process is more refined, so as to better control network access permission, and improve network system security. Specific descriptions are as follows:

205. The local gateway obtains a subnet identifier corresponding to the UE.

The subnet identifier is used to identify a subnet in the local network. The subnet may be one (for example, a subnet having a highest priority) of multiple subnets in the local network, or may be a unique subnet in the local network (that is, the subnet may be the local network, and the subnet identifier is an identifier of the local network). This is not limited herein.

Optionally, after the user plane bearer that is from the eNB to the C-GW and that includes the local gateway, corresponding to the UE, used as the intermediate node is established, the local gateway can obtain the UE identifier that uniquely identifies the UE. A correspondence between the UE identifier and the subnet identifier may be stored in the user management server or user subscription information. The local gateway may search for the correspondence according to the UE identifier that uniquely identifies the UE, to obtain the subnet identifier corresponding to the UE. In actual application, the MME may first search for the correspondence according to the UE identifier that uniquely identifies the UE, to obtain the subnet identifier corresponding to the UE, and then send the subnet identifier to the local gateway. This is not limited herein.

Optionally, in actual application, a stored correspondence may include a correspondence between the UE identifier and a user group and a correspondence between the user group and the subnet identifier. When determining a subnet corresponding to the UE, the MME may first determine the user group according to the correspondence between the UE identifier and the user group, and then determine, according to the correspondence between the user group and the subnet identifier, the subnet identifier corresponding to the UE (for example, alternatively, the obtained function information of the eNB may include information about a subnet that is in the local network and that is supported by the local gateway L-GW connected to the eNB, and the MME may determine the user group according to the UE identifier, and then determine, according to the user group and the information about the subnet that is supported by the local gateway L-GW, the subnet identifier corresponding to the UE). Optionally, the subnet identifier may not exist, the user group is associated with the subnet, and an identifier of the user group is used as an identifier of the subnet. This is not limited herein.

206. The local gateway routes, to a subnet identified by the subnet identifier, data used by the UE to access a local network.

It may be understood that, before routing, to the subnet identified by the subnet identifier, the data used by the UE to access the local network, when receiving data used by the UE to access a network (a data packet carrying the data carries a source IP address and a destination IP address of the data), the local gateway may determine, according to the destination IP address of the data used by the UE to access a network, whether the data used by the UE to access a network is the data used to access the local network. The local gateway stores a list of an IP address of a network device in the subnet corresponding to the UE. When determining that the received data is not the data used to access the local network, the local gateway forwards, to the C-GW, the data used by the UE to access a network. The local gateway routes, to the subnet identified by the subnet identifier, the data used by the UE to access the local network, only when determining that the received data is the data used to access the local network.

It should be noted that the local gateway obtains, in many manners, the list of the IP address of the network device in the subnet corresponding to the UE. Optionally, the list may be configured by an open platform. Optionally, the list of the IP address of the network device in the subnet corresponding to the UE may be read by the MME from a domain name system server, and then be sent to the local gateway. This is not limited herein.

Optionally, step 207 to step 209 may be further included in another embodiment of the method for accessing a local network in this embodiment of the present application, so that the UE can directly access a service server in the subnet in the local network by using a domain name, to send a service request to the service server in the subnet. In the foregoing embodiment, the user plane bearer that is from the eNB to the C-GW and that includes the local gateway, corresponding to the UE, used as the intermediate node is established, and the subnet corresponding to the UE in the local network in which the local gateway is used as a gateway is determined. In this case, the UE can simultaneously access the local network and the operator network. In actual application, the UE may directly access the service server in the subnet by using an IP address, or may access the service server in the subnet by using the domain name. In this case, domain name resolution needs to be performed on the domain name to obtain an IP address that is of the service server in the subnet and that corresponds to the domain name. After step 204 and before step 206 in the foregoing embodiment, steps 207 to 209 may be further included, so that the service server in the subnet is accessed by using the domain name. Specific descriptions are as follows:

207. The UE sends a domain name resolution request to a DNS server, where the domain name resolution request includes a domain name of a service server in the subnet.

It should be noted that, on any occasion before step 207, the MME may search, according to the UE identifier that uniquely identifies the UE, for the correspondence that is between the UE identifier and the subnet identifier and that is stored in the MME, the user management server, or the user subscription information, to obtain the subnet identifier corresponding to the UE; afterward, send the subnet identifier corresponding to the UE to the C-GW; and then forward, to the UE, a domain name system server DNS server address that is assigned to the subnet corresponding to the UE and that is returned by the C-GW. In this way, the UE may determine the DNS server address.

After obtaining the DNS server address, the UE may send the domain name resolution request to the DNS server. The domain name resolution request includes the domain name of the service server that is in the subnet and that the UE requests to access.

208. The DNS server returns an IP address of the service server in the subnet to the UE according to the domain name of the service server in the subnet.

209. The UE sends a service request to the service server according to the IP address.

It may be understood that, a correspondence that is in the DNS server and that is between the domain name of the service server in the subnet and the IP address of the service server in the subnet may be configured by using the open platform.

Optionally, step 210 to step 212 may be further included in another embodiment of the method for accessing a local network in this embodiment of the present application. A network name of the subnet is sent to the UE, so that the network name can be displayed on a user interface of the UE, so as to help the user more intuitively know a currently accessed subnet, and improve man-machine interaction performance. Specific descriptions are as follows:

210. The MME obtains a network name of the subnet corresponding to the UE.

It may be understood that a correspondence between the UE identifier and the network name of the subnet or a correspondence between the subnet and the network name of the subnet may be further stored in the MME, the user management server, or the user subscription information. The MME may search for the correspondence according to the UE identifier or the subnet corresponding to the UE, to obtain the network name of the subnet corresponding to the UE.

211. The MME sends the network name to the UE by using a NAS message.

212. After receiving the network name sent by the MME by using the NAS message, the UE displays the network name on a user interface of the UE.

It may be understood that after steps 201 to 204, steps 205 and 206, steps 207 to 209, and steps 210 to 212 may be combined with each other, or it is determined, according to an actual application situation, whether to perform the steps. This is not limited herein.

The foregoing describes the method for accessing a local network in this embodiment of the present application from the perspective of signaling exchange between the devices in the network system. The following describes a method for accessing a local network in an embodiment of the present application from a perspective of each network device.

Figure 3:
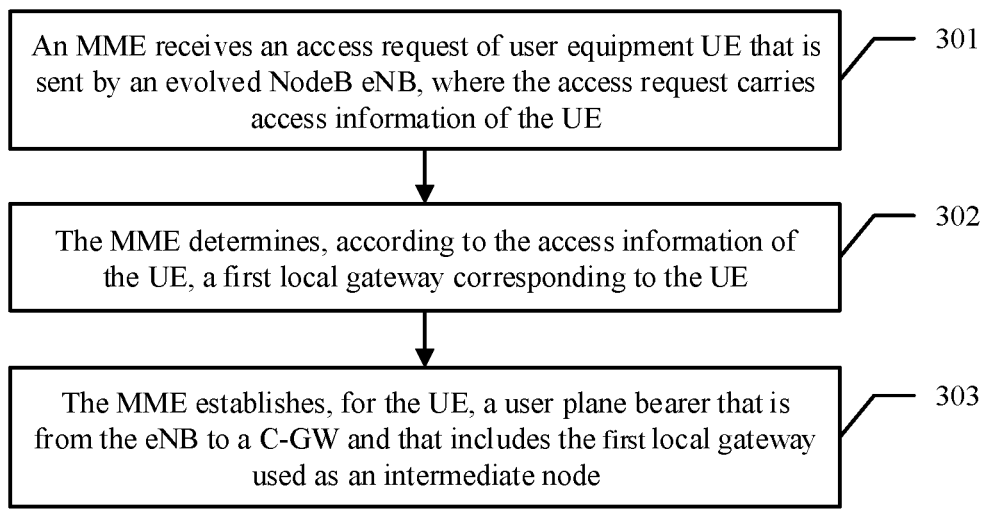
FIG. 3 is a schematic flowchart of a method for accessing a local network according to an embodiment of the present application.

1. From a perspective of an MME:

Referring to FIG. 3, an embodiment of a method for accessing a local network in an embodiment of the present application includes the following steps.

301. An MME receives an access request of user equipment UE that is sent by a base station eNB, where the access request carries access information of the UE.

The MME is a mobility management entity of a core network, and a gateway of the core network is a C-GW.

In this step, the UE first accesses the eNB, and then accesses the core network by using the eNB, that is, sends, to the MME, the access request for accessing the core network. The access request carries the access information of the UE. The access information includes a UE identifier that uniquely identifies the UE.

302. The MME determines, according to the access information of the UE, a first local gateway corresponding to the UE.

The first local gateway is a gateway of a first local network.

It may be understood that the access information includes the UE identifier used to uniquely identify the UE. The MME or a user management server stores a correspondence between the UE identifier and a local gateway. The MME may search for the correspondence according to the UE identifier in the access information, to obtain the first local gateway corresponding to the UE. In actual application, because the UE performs access by using the eNB, the eNB may also search for the correspondence according to the UE identifier, to obtain the first local gateway corresponding to the UE; and then send the first local gateway to the MME. This is not limited herein.

Optionally, in actual application, the MME may obtain function information of the eNB. The function information may include information about a local gateway accessed by the eNB. Alternatively, the MME may determine, according to the information about the local gateway accessed by the eNB and a found local gateway corresponding to the UE identifier, the first local gateway corresponding to the UE. This is not limited herein. Alternatively, the function information of the eNB may include information about a subnet that is in a local network and that is supported by a local gateway L-GW connected to the eNB. It may be understood that the function information of the eNB may be sent by the eNB to the MME, or may be obtained by the MME in another manner, for example, obtained from a database by querying the eNB, a local network identifier, a local gateway identifier, or the like by using a DNS server. This is not limited herein.

303. The MME establishes, for the UE, a user plane bearer that is from the eNB to a C-GW and that includes the first local gateway used as an intermediate node.

After determining the first local gateway corresponding to the UE, the MME establishes, for the UE, the user plane bearer that is from the eNB to the C-GW and that includes the local gateway used as the intermediate node.

In this embodiment of the present application, the mobility management entity MME in the core network can determine, according to the access information of the user equipment UE that is carried in the access request of the UE that is sent by the base station eNB, the first local gateway corresponding to the UE, where the first local gateway is the gateway of the first local network; and establish, for the UE, the user plane bearer that is from the eNB to the gateway C-GW of the core network and that includes the first local gateway used as the intermediate node. In this way, because the first local gateway is used as the intermediate node in the user plane bearer, a data connection is established between the eNB and each of the gateway C-GW of the core network and the gateway of the first local network. The UE can access not only an operator network but also the first local network by using the eNB, so that a user equipment can simultaneously access the operator network and the local network.

In the foregoing embodiment, the MME determines the first local gateway corresponding to the UE. In actual application, the MME determines the first local gateway in multiple manners. The MME may determine the first local gateway directly by using a local gateway corresponding to the UE, or by using a subnet corresponding to the UE. In addition, the UE may correspond to one or more local gateways or subnets. This is not limited herein. The following specifically describes, by using the several cases as examples, a method for accessing a local network in an embodiment of the present application.

1. UE directly corresponds to a local gateway.

Figure 4:
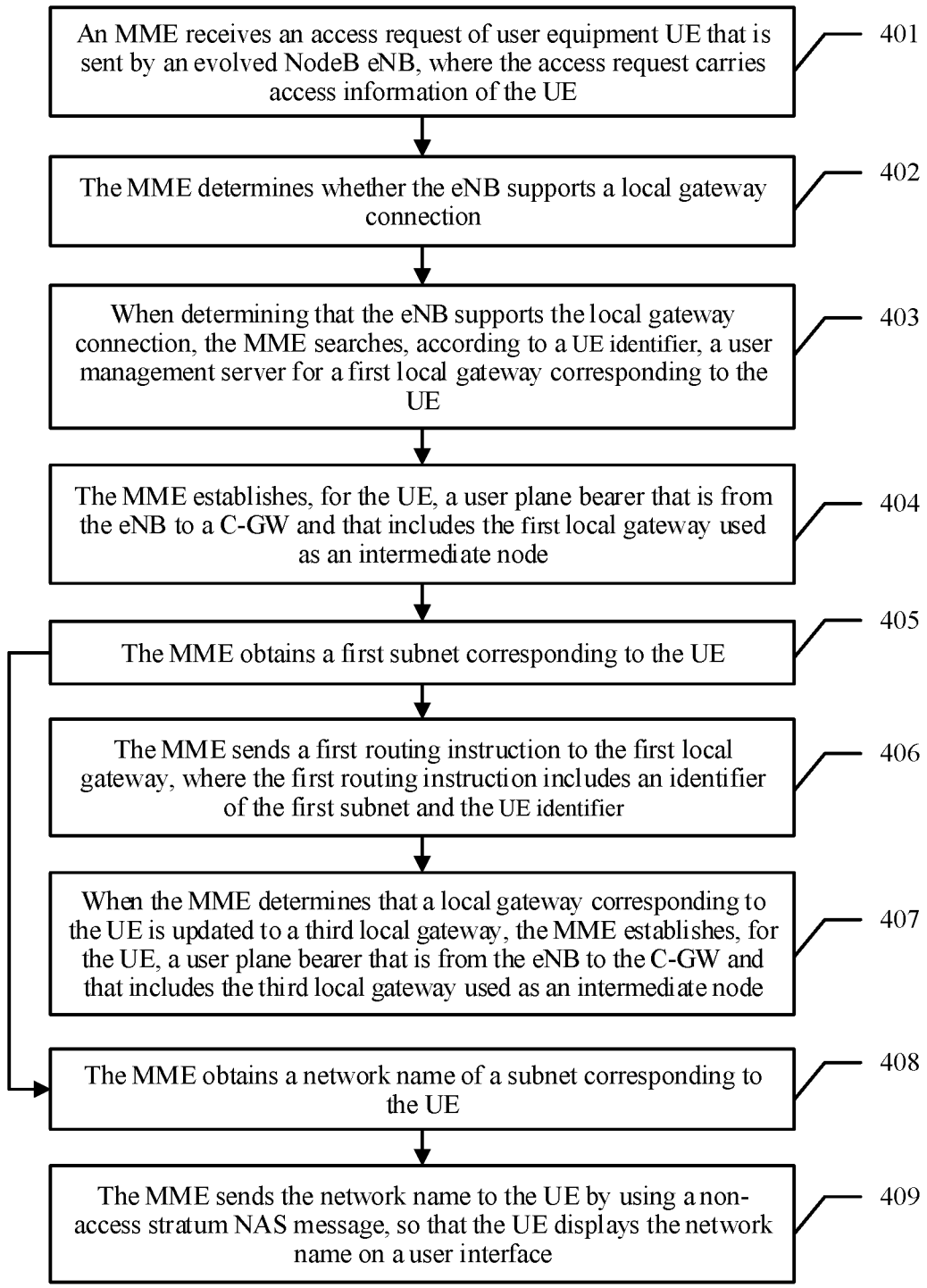
FIG. 4 is another schematic flowchart of a method for accessing a local network according to an embodiment of the present application.

Referring to FIG. 4, another embodiment of a method for accessing a local network in an embodiment of the present application includes the following steps.

401. An MME receives an access request of user equipment UE that is sent by an base station eNB, where the access request carries access information of the UE.

The MME is a mobility management entity of a core network, and a gateway of the core network is a C-GW.

In this step, the UE first accesses the eNB, and then accesses the core network by using the eNB, that is, sends, to the MME, the access request for accessing the core network. The access request carries the access information of the UE. The access information includes a UE identifier that uniquely identifies the UE.

402. The MME determines whether the eNB supports a local gateway connection.

The access information may further include an identifier of the eNB. It may be understood that the MME or the core network may store function information of each eNB. The function information of each eNB records a function supported by the eNB. The MME may query the function of each eNB by using an identifier of the eNB. In this step, the MME may determine, by querying a function of the eNB, whether the eNB supports the local gateway connection.

Alternatively, the function information of the eNB may include information about a subnet that is in a local network and that is supported by a local gateway L-GW connected to the eNB. It may be understood that the function information of the eNB may be sent by the eNB to the MME, or may be obtained by the MME in another manner, for example, obtained from a database by querying the eNB, a local network identifier, a local gateway identifier, or the like by using a DNS server. This is not limited herein.

In actual application, the MME may first determine whether the eNB accessed by the UE supports the local gateway connection, and trigger step 403 only when determining that the eNB supports the local gateway connection, or when determining that the eNB does not support the local gateway connection, may directly connect the UE and the core network, and does not need to perform subsequent steps in this embodiment.

403. When determining that the eNB supports the local gateway connection, the MME searches, according to a UE identifier, a user management server for a first local gateway having a highest priority in multiple local gateways corresponding to the UE, where the multiple local gateways have different priorities, the access information includes the UE identifier, and the UE identifier is used to uniquely identify the UE.

In this step, the user management server stores a correspondence between the UE and a local gateway. The correspondence may be specifically a correspondence between the local gateway and the UE identifier that uniquely identifies the UE. One UE may correspond to multiple local gateways, and the local gateways have different priorities. When determining that the eNB supports the local gateway connection, the MME searches the user management server for a local gateway having a highest priority in the multiple local gateways corresponding to the UE, and uses the local gateway as the first local gateway. Optionally, in actual application, when one UE corresponds to multiple local gateways, a local gateway having an optimal calculation result may be selected as the first local gateway according to load balance calculation. Optionally, in actual application, the MME may obtain the function information of the eNB. The function information may include information about a local gateway accessed by the eNB. Alternatively, the MME may determine, according to the information about the local gateway accessed by the eNB and a found local gateway corresponding to the UE identifier, the first local gateway corresponding to the UE. Alternatively, there may be another manner of determining a local gateway currently corresponding to the UE in the multiple local gateways corresponding to the UE. This is not limited herein.

It may be understood that, in actual application, the UE may correspond to only one local gateway. In this case, the MME uses the local gateway corresponding to the UE as the first local gateway.

404. The MME establishes, for the UE, a user plane bearer that is from the eNB to a C-GW and that includes the first local gateway used as an intermediate node.

After determining the first local gateway corresponding to the UE, the MME establishes, for the UE, the user plane bearer that is from the eNB to the C-GW and that includes the first local gateway used as the intermediate node.

It may be understood that the user plane bearer that includes the first local gateway used as the intermediate node means that: A user plane data channel (which may be, for example, a PDN data channel or another data channel, and is not limited herein) for accessing core network and Internet services by using the C-GW is established between the eNB and the C-GW, and the first local gateway is used as the intermediate node. On an eNB side, the eNB is connected to the first local gateway. On a C-GW side, the first local gateway is connected to the C-GW. A data flow used by the user equipment to access the core network and Internet services is forwarded by the first local gateway between the eNB and the C-GW. Data used by the user equipment to access a service of a first local network is locally routed by the first local gateway to the first local network.

405. The MME obtains a first subnet corresponding to the UE.

After establishing the user plane bearer that is from the eNB to the C-GW and in which the first local gateway is used as the intermediate node, the MME may obtain the first subnet corresponding to the UE.

It may be understood that, a correspondence between the UE and a subnet may be stored in the user management server, may be stored in user subscription data, or may be stored in another location such as the local gateway. This is not limited herein.

It may be understood that, in actual application, the MME obtains, in many manners, the first subnet corresponding to the UE. Optionally, the MME may first determine a user group corresponding to the UE, and then determine, according to location information of the UE and/or a current time and the user group, the first subnet corresponding to the UE. The location information of the UE may be current location information of the UE that is reported by the UE or obtained by the MME, or may be an identifier of the eNB. This is not limited herein.

For example, if the UE belongs to a user group 1, it may be set in such a manner that the user group 1 corresponds to a subnet 1 before 12:00 am, and that the user group 1 corresponds to a subnet 2 after 12:00 am. Alternatively, there may be a correspondence between the subnet and another combination of the user group, the location information of the UE, and the current time. This is not limited herein.

406. The MME sends a first routing instruction to the first local gateway, where the first routing instruction includes an identifier of the first subnet and the UE identifier, and the first routing instruction is used to instruct to route, to the first subnet, data used by the UE to access a first local network.

After obtaining the identifier of the first subnet corresponding to the UE, the MME sends the first routing instruction to the first local gateway. The first routing instruction includes the identifier of the first subnet and the UE identifier. The first routing instruction is used to instruct to route, to the first subnet, the data used by the UE to access the first local network.

In steps 405 and 406, the MME may obtain the identifier of the first subnet corresponding to the UE, and then send the first routing instruction to the local gateway. In actual application, in addition to the MME, the local gateway may obtain a subnet corresponding to the UE. In this case, the MME no longer needs to obtain the subnet. This is not limited herein. Therefore, it may be understood that, in this embodiment, in different application scenarios, steps 405 and 406 may or may not exist. This is not limited herein.

Optionally, in actual application, the MME may further send an identifier of a subnet corresponding to the UE to the C-GW, and then receive a domain name system server address that is assigned to the subnet corresponding to the UE and that is returned by the C-GW. A domain name system server identified by the domain name system server address stores a correspondence between a domain name and an IP address of a network device in the subnet corresponding to the UE.

Optionally, in actual application, the MME may further send an identifier of a local network corresponding to the UE to the C-GW, and then receive a domain name system server address that is assigned to the local network corresponding to the UE and that is returned by the C-GW. A domain name system server identified by the domain name system server address stores a correspondence between a domain name and an IP address of a network device in the local network corresponding to the UE.

407. When the MME determines that a local gateway having a highest priority is updated to a third local gateway, the MME establishes, for the UE, a user plane bearer that is from the eNB to the C-GW and that includes the third local gateway used as an intermediate node, where the third local gateway is different from the first local gateway.

After the first local gateway is used as the intermediate node of the user plane bearer, the user may also change, according to an actual requirement, the local network corresponding to the local gateway corresponding to the UE, for example, change a priority of each of the multiple local gateways corresponding to the UE, so that the local gateway having the highest priority is updated to another local gateway such as the third local gateway. The third local gateway is a gateway of a third local network. The MME can obtain, by monitoring a local-gateway priority change or receiving a message sent by the user management server, an update to the priorities of the local gateways corresponding to the UE. When the MME determines that the local gateway having the highest priority is updated to the third local gateway, the MME establishes, for the UE, the user plane bearer that is from the eNB to the C-GW and that includes the third local gateway used as the intermediate node. It may be understood that, in addition, the MME may delete the user plane bearer in which the first local gateway is used as the intermediate node. The third local gateway is different from the first local gateway.

It should be noted that, after the user plane bearer in which the third local gateway is used as the intermediate node is established, an identifier of a subnet corresponding to the UE in the third local network may also be determined. This is not limited herein.

It may be understood that, according to an actual application situation, in different application scenarios, step 407 may or may not exist. This is not limited herein.

408. The MME obtains a network name of a subnet corresponding to the UE.

409. The MME sends the network name to the UE by using a non-access stratum NAS message, so that the UE displays the network name on a user interface.

It may be understood that, according to an actual application situation, in different application scenarios, steps 408 and 409 may or may not exist. This is not limited herein.

In this embodiment of the present application, the MME can determine the local gateway that has the highest priority and that corresponds to the UE, and establish the user plane bearer in which the local gateway is used as the intermediate node, so that an operator network and the local network in which the local gateway is used as a gateway are simultaneously accessed. Further, the MME can determine the identifier of the subnet corresponding to the UE in the local network, and send the routing instruction to the local gateway, so that the local gateway routes, to the subnet, all data used by the UE to access the local network, so as to implement precise control on network access permission.

2. UE corresponds to a subnet, and a local gateway corresponding to the UE is determined by using the subnet.

Figure 5A:
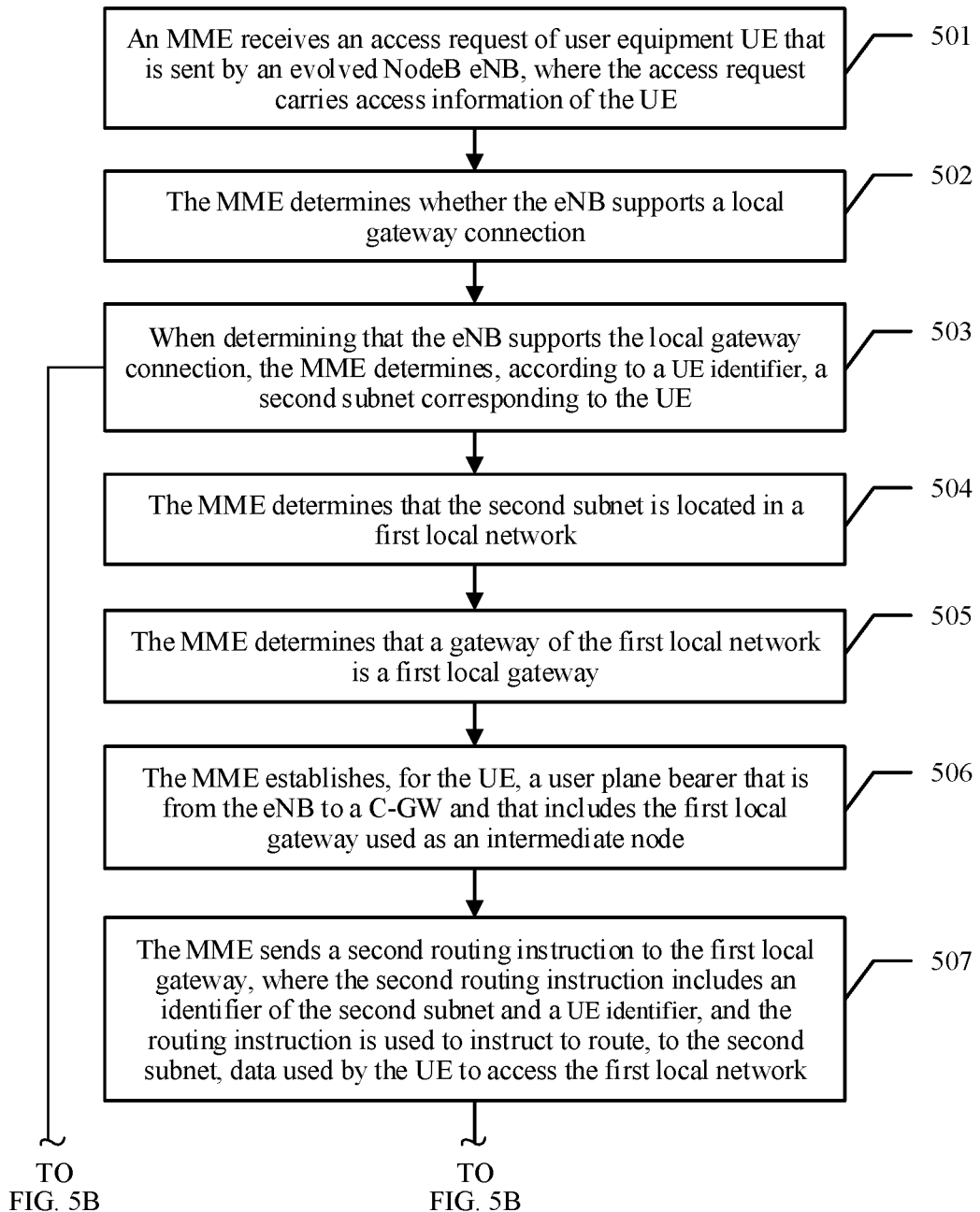
FIG. 5A and FIG. 5B are another schematic flowchart of a method for accessing a local network according to an embodiment of the present application.
Figure 5B:
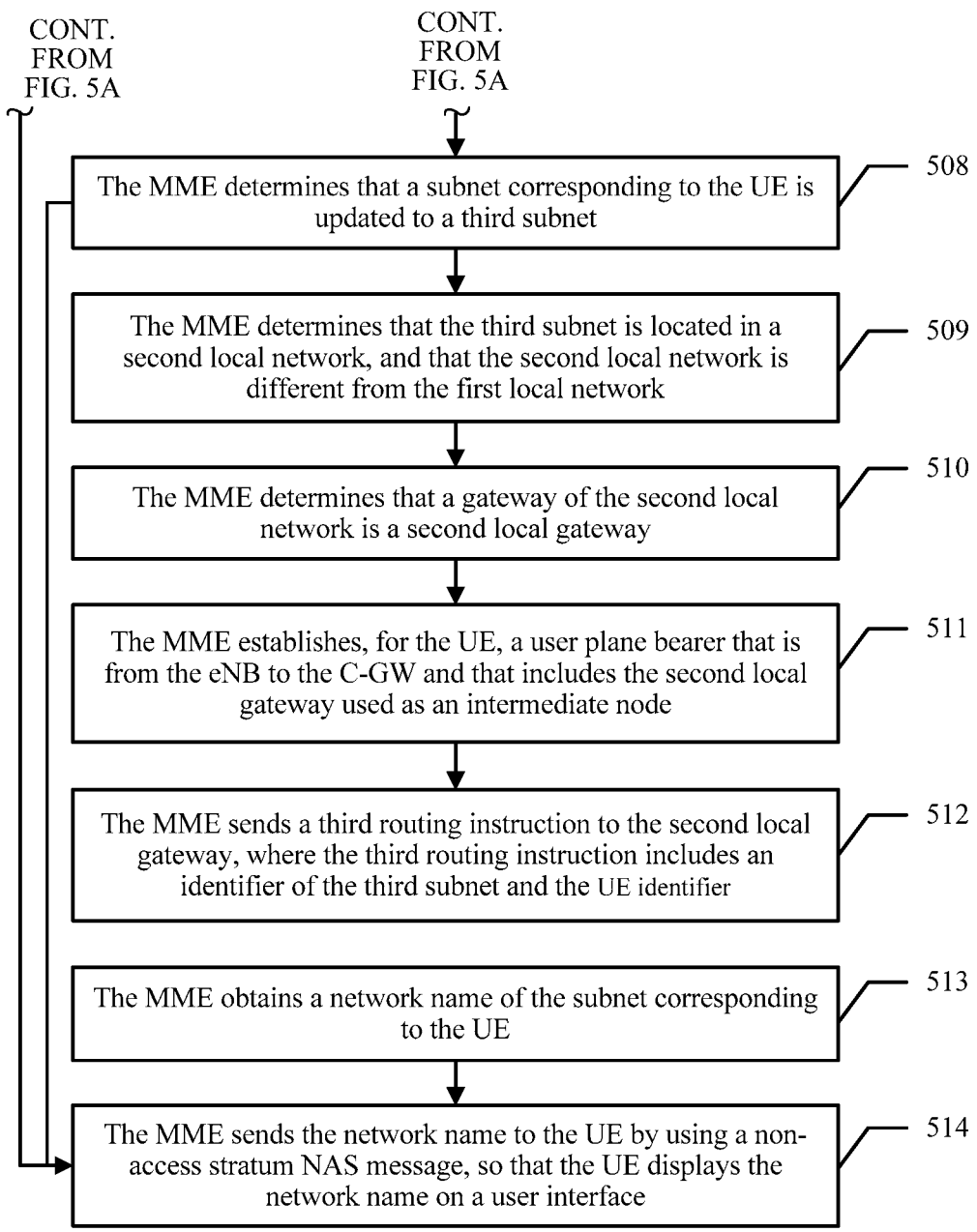

Referring to FIG. 5A and FIG. 5B, another embodiment of a method for accessing a local network in an embodiment of the present application includes the following steps.

501. An MME receives an access request for accessing a core network that is sent by user equipment UE by using a base station eNB, where the access request carries access information of the UE.

502. The MME determines whether the eNB supports a local gateway connection.

Steps 501 and 502 are similar to steps 401 and 402. Details are not described herein again.

503. When determining that the eNB supports the local gateway connection, the MME determines, according to a UE identifier, a second subnet corresponding to the UE.

In this embodiment, a correspondence exists between the UE and a subnet. In addition, one UE may correspond to multiple subnets, and the multiple subnets have different priorities.

It may be understood that the MME or a user management server stores the correspondence between the UE and the subnet. The correspondence may be specifically a correspondence between the subnet and the UE identifier that uniquely identifies the UE. The MME may determine, according to the correspondence and the UE identifier that uniquely identifies the UE and that is in the access information, the second subnet corresponding to the UE.

In this step, the MME can determine the second subnet corresponding to the UE. The second subnet is a subnet having a highest priority in multiple subnets currently corresponding to the UE or a subnet uniquely corresponding to the UE.

It may be understood that, the MME may determine, by monitoring or searching the user management server or user subscription data, the second subnet corresponding to the UE; or may determine, by receiving a message that includes the second subnet corresponding to the UE and that is sent by the user management server or the eNB, the second subnet corresponding to the UE. This is not limited herein.

Optionally, the MME may first obtain a user group corresponding to the UE, and then determine, according to location information of the UE and/or a current time and the user group, the second subnet corresponding to the UE. The location information of the UE may be current location information of the UE that is reported by the UE or obtained by the MME, or may be an identifier of the eNB. This is not limited herein.

For example, if the UE belongs to a user group 3, it may be set in such a manner that the user group 3 corresponds to a subnet 3 when the UE is at a location 1, and corresponds to a subnet 4 when the UE is at a location 2. Alternatively, there may be a correspondence between the subnet and another combination of the user group, the location information of the UE, and the current time. This is not limited herein.

504. The MME determines that the second subnet is located in a first local network.

After determining the second subnet corresponding to the UE, the MME determines that the second subnet is located in the first local network.

505. The MME determines that a gateway of the first local network is a first local gateway.

After determining that the second subnet corresponding to the UE is located in the first local network, the MME determines that the gateway of the first local network is the first local gateway.

506. The MME establishes, for the UE, a user plane bearer that is from the eNB to a C-GW and that includes the first local gateway used as an intermediate node.

This step is similar to step 404. Details are not described herein again.

507. The MME sends a second routing instruction to the first local gateway, where the second routing instruction includes an identifier of the second subnet and a UE identifier, and the routing instruction is used to instruct to route, to the second subnet, data used by the UE to access the first local network.

After establishing, for the UE, the user plane bearer in which the first local gateway is used as the intermediate node, the MME sends the second routing instruction to the first local gateway. The second routing instruction includes the identifier of the second subnet corresponding to the UE and the UE identifier. The routing instruction is used to instruct to route, to the second subnet uniquely identified by the identifier of the second subnet, the data used by the UE to access the first local network.

Optionally, in actual application, the MME may further send an identifier of a subnet corresponding to the UE to the C-GW, and then receive a domain name system server address that is assigned to the subnet corresponding to the UE and that is returned by the C-GW. A domain name system server identified by the domain name system server address stores a correspondence between a domain name and an IP address of a network device in the subnet corresponding to the UE.

Optionally, in actual application, the MME may further send an identifier of a local network corresponding to the UE to the C-GW, and then receive a domain name system server address that is assigned to the local network corresponding to the UE and that is returned by the C-GW. A domain name system server identified by the domain name system server address stores a correspondence between a domain name and an IP address of a network device in the local network corresponding to the UE.

508. The MME determines that a subnet corresponding to the UE is updated to a third subnet.

In actual application, according to a requirement, the user can change the subnet corresponding to the UE or a priority of the subnet, so that the subnet uniquely corresponding to the UE or having the highest priority is updated to another subnet such as the third subnet. The third subnet and the second subnet are different, and are located in different local networks. The MME can obtain, by monitoring the subnet (the priority of the subnet) corresponding to the UE or receiving a message sent by the user management server, an update to the subnet corresponding to the UE. In this step, the MME may determine that the subnet corresponding to the UE is updated to the third subnet. The third subnet is a subnet having a highest priority in the multiple subnets currently corresponding to the UE or a subnet uniquely corresponding to the UE.

It may be understood that, the MME may determine, by monitoring or searching the user management server or the user subscription data, that the subnet corresponding to the UE is updated to the third subnet; or may determine, by receiving a message that includes information indicating that the subnet identifier corresponding to the UE is updated to the third subnet and that is sent by the user management server or the eNB, that the subnet identifier corresponding to the UE is updated to the third subnet. Alternatively, the MME may determine, because a combination of the user group corresponding to the UE and the location information of the UE and/or the current time corresponds to the third subnet, that the subnet corresponding to the UE is updated to the third subnet. This is not limited herein.

509. The MME determines that the third subnet is located in a second local network, wherein the second local network is different from the first local network.

After determining that the subnet corresponding to the UE is updated to the third subnet, the MME determines that the third subnet is located in the second local network, wherein the second local network is different from the first local network.

It should be understood that, in this step, the second local network in which the updated subnet corresponding to the UE is located is different from the first local network. In actual application, in some scenarios, the second local network in which the updated subnet corresponding to the UE is located and the first local network may be a same local network. This is not limited herein.

510. The MME determines that a gateway of the second local network is a second local gateway.

After determining that the updated third subnet corresponding to the UE is located in the second local network, the MME determines that the gateway of the second local network is the second local gateway.

511. The MME establishes, for the UE, a user plane bearer that is from the eNB to the C-GW and that includes the second local gateway used as an intermediate node, where the second local gateway is different from the first local gateway.

It may be understood that the user plane bearer that includes the second local gateway used as the intermediate node means that: A user plane data channel (which may be, for example, a PDN data channel or another data channel, and is not limited herein) for accessing core network and Internet services by using the C-GW is established between the eNB and the C-GW, and the second local gateway is used as the intermediate node. On an eNB side, the eNB is connected to the second local gateway. On a C-GW side, the second local gateway is connected to the C-GW. A data flow used by the user equipment to access the core network and Internet services is forwarded by the second local gateway between the eNB and the C-GW. Data used by the user equipment to access a service of the second local network is locally routed by the second local gateway to the second local network.

512. The MME sends a third routing instruction to the second local gateway, where the third routing instruction includes an identifier of the third subnet and the UE identifier, and the routing instruction is used to instruct to route, to the third subnet, data used by the UE to access the second local network.

It may be understood that, according to different actual application scenarios, steps 508 to 512 may or may not exist. This is not limited herein.

513. The MME obtains a network name of the subnet corresponding to the UE.

514. The MME sends the network name to the UE by using a non-access stratum NAS message, so that the UE displays the network name on a user interface.

It may be understood that, according to an actual application situation, in different application scenarios, steps 513 and 514 may or may not exist. This is not limited herein.

In this embodiment of the present application, the MME can determine the subnet that has the highest priority and that corresponds to the UE or the subnet that uniquely corresponds to the UE, obtain the local network in which the subnet is located, then determine the local gateway of the local network, and establish, for the UE, the user plane bearer by using the local gateway as the intermediate node, so that an operator network and the local network are simultaneously accessed. In addition, the MME sends the routing instruction to the local gateway to instruct the local gateway to route, to the subnet corresponding to the UE, the data used by the UE to access the local network, so as to implement precise control on network access permission.

2. From a perspective of a local gateway:

An embodiment of a method for accessing a local network in an embodiment of the present application includes:

receiving, by a local gateway, a user plane establishment request sent by an MME, where the user plane establishment request includes information about a user plane bearer that is from the local gateway to a C-GW and that is established by the MME for UE, the MME is a mobility management entity of a core network, a gateway of the core network is the C-GW, the UE accesses the core network by using an eNB, and the local gateway is a local gateway corresponding to the UE; and establishing, by the local gateway for the UE according to the user plane establishment request, a user plane bearer that is from the eNB to the C-GW and that includes the local gateway used as an intermediate node.

In this embodiment, the local gateway can establish, for the UE, the user plane bearer in which the local gateway is used as the intermediate node, so that the UE accesses an operator network and a local network in which the local gateway is used as a gateway.

In actual application, there may be multiple different subnets in the local network. Each subnet is uniquely identified by a different subnet identifier. The UE may have permission to access some of the subnets, that is, correspond to some or one of the subnets. The correspondence may be determined by the local gateway by means of querying, or may be determined according to a routing instruction sent by the MME. This is not limited herein. Descriptions are separately provided below.

1. A local gateway obtains a correspondence by means of querying.

Figure 6:
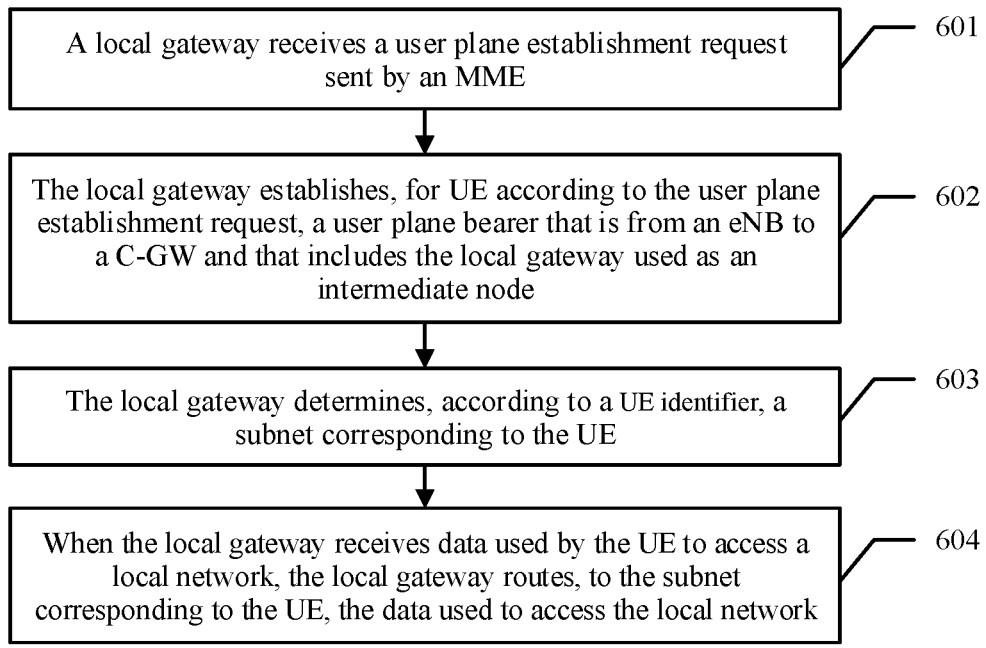
FIG. 6 is another schematic flowchart of a method for accessing a local network according to an embodiment of the present application.

Referring to FIG. 6, another embodiment of a method for accessing a local network in an embodiment of the present application includes the following steps.

601. A local gateway receives a user plane establishment request sent by an MME.

The user plane establishment request includes information about a user plane bearer that is from the local gateway to a C-GW and that is established by the MME for UE. The MME is a mobility management entity of a core network. A gateway of the core network is the C-GW. The UE accesses the core network by using an eNB. The local gateway is a local gateway corresponding to the UE.

602. The local gateway establishes, for a UE according to the user plane establishment request, a user plane bearer that is from an eNB to a C-GW and that includes the local gateway used as an intermediate node.

603. The local gateway determines, according to a UE identifier, a subnet corresponding to the UE.

It may be understood that the local gateway may store a correspondence between the UE and the subnet, or may obtain the correspondence between the UE and the subnet from a user management server or user subscription data. This is not limited herein. The UE is uniquely identified by the UE identifier. The UE identifier may be carried in the user plane establishment request, or may be carried in other information sent by the MME to the local gateway. This is not limited herein.

604. When the local gateway receives data used by the UE to access a local network, the local gateway routes, to the subnet corresponding to the UE, the data used to access the local network.

Optionally, in actual application, the local gateway stores a list of an IP address of a network device in the subnet corresponding to the UE. The list may be configured by an open platform in the local gateway, or may be forwarded by the MME. When the local gateway receives data used by the UE to access a network, the local gateway determines, according to a destination IP address of the data used by the UE to access a network, whether the data used by the UE to access a network is the data used to access the local network. When determining that the received data is not the data used to access the local network, the local gateway forwards, to the C-GW, the data used by the UE to access a network; or when determining that the received data is the data used to access the local network, routes, to the subnet corresponding to the UE, the data used by the UE to access the local network.

In this embodiment, after establishing, for the UE, the user plane bearer in which the local gateway is used as the intermediate node, the local gateway obtains the subnet corresponding to the UE, and routes, to the subnet corresponding to the UE, the data used by the UE to access the local network, so as to implement fine control on network access permission.

2. A correspondence is determined according to a routing instruction sent by an MME.

Figure 7:
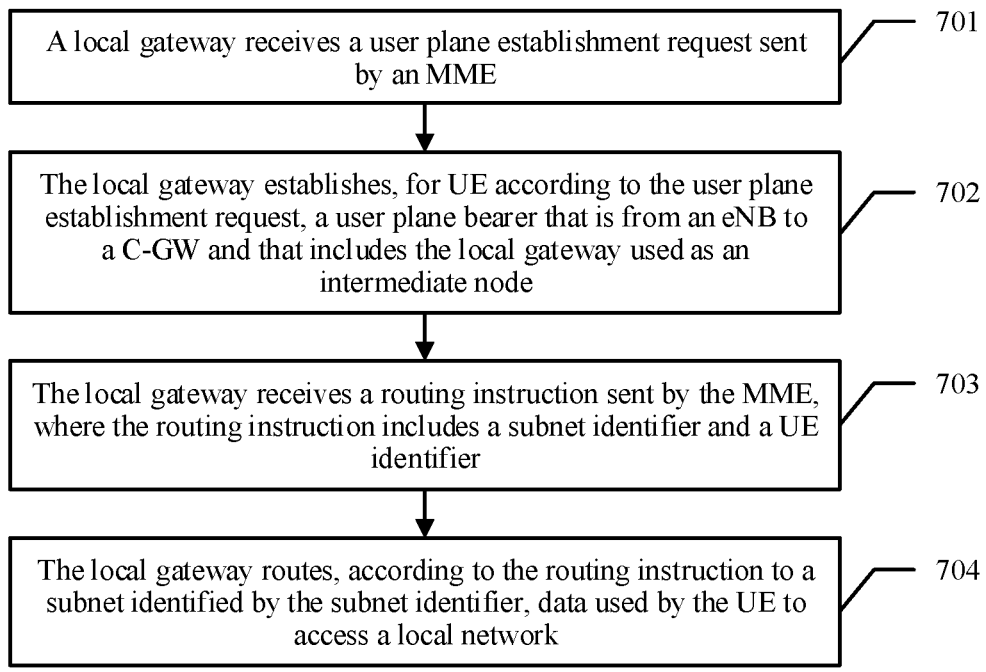
FIG. 7 is another schematic flowchart of a method for accessing a local network according to an embodiment of the present application.

Referring to FIG. 7, another embodiment of a method for accessing a local network in an embodiment of the present application includes the following steps.

701. A local gateway receives a user plane establishment request sent by an MME.

The user plane establishment request includes information about a user plane bearer that is from the local gateway to a C-GW and that is established by the MME for UE. The MME is a mobility management entity of a core network. A gateway of the core network is the C-GW. The UE accesses the core network by using an eNB. The local gateway is a local gateway corresponding to the UE.

702. The local gateway establishes, for the UE according to the user plane establishment request, a user plane bearer that is from an eNB to a C-GW and that includes the local gateway used as an intermediate node.

703. The local gateway receives a routing instruction sent by the MME, where the routing instruction includes a subnet identifier and a UE identifier, the subnet identifier is used to uniquely identify a subnet, and the UE identifier is used to uniquely identify the UE.

704. The local gateway routes, according to the routing instruction to the subnet identified by the subnet identifier, data used by the UE to access a local network.

Optionally, in actual application, the local gateway stores a list of an IP address of a network device in the subnet corresponding to the UE. The list may be configured by an open platform in the local gateway, or may be forwarded by the MME. When the local gateway receives data used by the UE to access a network, the local gateway determines, according to a destination IP address of the data used by the UE to access a network, whether the data used by the UE to access a network is the data used to access the local network. When determining that the received data is not the data used to access the local network, the local gateway forwards, to the C-GW, the data used by the UE to access a network; or when determining that the received data is the data used to access the local network, routes, to the subnet identified by the subnet identifier, the data used by the UE to access the local network.

In this embodiment of the present application, the MME obtains the subnet identifier corresponding to the UE, and the local gateway receives the routing instruction sent by the MME, and routes, according to the routing instruction to the subnet identified by the subnet identifier, the data used by the UE to access the local network, so as to implement fine control on network access permission, and relieve data processing pressure of the local gateway.

Figure 8:
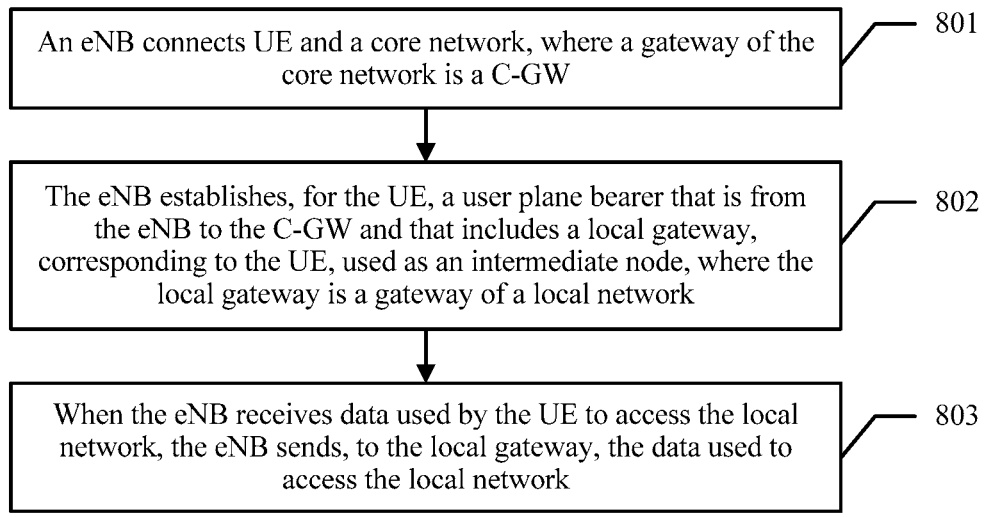
FIG. 8 is another schematic flowchart of a method for accessing a local network according to an embodiment of the present application.

3. From a perspective of an eNB:

Referring to FIG. 8, another embodiment of a method for accessing a local network in an embodiment of the present application includes the following steps:

801. An eNB connects UE and a core network, where a gateway of the core network is a C-GW.

802. The eNB establishes, for the UE, a user plane bearer that is from the eNB to the C-GW and that includes a local gateway, corresponding to the UE, used as an intermediate node, where the local gateway is a gateway of a local network.

803. When the eNB receives data used by the UE to access the local network, the eNB sends, to the local gateway, the data used to access the local network.

It may be understood that, the eNB can determine, by using a destination IP address of data used by the UE to access a network, that the data is the data used to access the local network; and send the data to the local gateway. Alternatively, the eNB may send, to the local gateway, data used by the UE to access all networks. This is not limited herein.

In this embodiment, after establishing, for the UE, the user plane bearer in which the local gateway is used as the intermediate node, the eNB can send, to the local gateway, the received data used by the UE to access the local network, so that an operator network and the local network are simultaneously accessed.

Optionally, in another embodiment of the method for accessing a local network in this embodiment of the present application, before establishing, for the UE, the user plane bearer in which the local gateway is used as the intermediate node, the eNB may first determine a local gateway or a local gateway identifier corresponding to the UE, and then notify the MME of the determined local gateway or local gateway identifier corresponding to the UE.

In the foregoing embodiments, there may be multiple specific implementations in which the MME, the local gateway, and the eNB establish, for the UE, the user plane bearer that is from the eNB to the C-GW and that includes the local gateway used as the intermediate node. For example, the implementations may be as follows:

The C-GW assigns an IP address and an end point identifier of a tunnel from the local gateway to the C-GW.

The MME obtains the IP address and the end point identifier of the tunnel from the local gateway to the C-GW that are assigned by the C-GW, and sends, to the local gateway, the IP address and the end point identifier of the tunnel from the local gateway to the C-GW that are assigned by the C-GW.

The local gateway obtains the IP address and the end point identifier of the tunnel from the local gateway to the C-GW that are assigned by the C-GW to a user plane of the UE.

The local gateway assigns, to the user plane of the UE, an IP address and an end point identifier of a tunnel from the C-GW to the local gateway and an IP address and an end point identifier of a tunnel from the eNB to the local gateway, and sends, to the MME, the IP address and the end point identifier of the tunnel from the C-GW to the local gateway that are assigned by the local gateway and the IP address and the end point identifier of the tunnel from the eNB to the local gateway that are assigned by the local gateway.

The MME obtains the IP address and the end point identifier of the tunnel from the C-GW to the local gateway that are assigned by the local gateway and the IP address and the end point identifier of the tunnel from the eNB to the local gateway that are assigned by the local gateway, sends, to the C-GW, the IP address and the end point identifier of the tunnel from the C-GW to the local gateway that are assigned by the local gateway, and sends, to the eNB, the IP address and the end point identifier of the tunnel from the eNB to the local gateway that are assigned by the local gateway.

The eNB obtains the IP address and the end point identifier of the tunnel from the eNB to the local gateway that are assigned by the local gateway to the user plane of the UE.

The eNB assigns, to the user plane of the UE, an IP address and an end point identifier of a tunnel from the local gateway to the eNB, and sends, to the MME, the IP address and the end point identifier of the tunnel from the local gateway to the eNB that are assigned by the eNB.

The MME obtains the IP address and the end point identifier of the tunnel from the local gateway to the eNB that are assigned by the eNB, and sends, to the local gateway, the IP address and the end point identifier of the tunnel from the local gateway to the eNB that are assigned by the eNB.

It may be understood that, there is no time sequence relationship between the foregoing assignment actions, and assignment may be performed in any time sequence. This is not limited herein.

In actual application, the IP addresses and the end point identifiers of the tunnels may be obtained by using messages between network elements. There may be multiple specific implementations. The following specifically describes, by using one manner as an example, a process of establishing the user plane bearer in which the local gateway is used as the intermediate node.

1. An MME sends a first request to a local gateway, where the first request is used to request to establish a data channel from the local gateway to each of an eNB and a C-GW.

It may be understood that, in actual application, optionally, a UE identifier used to uniquely identify UE may be carried in the first request, or the UE identifier may be carried in other information sent by the MME to the local gateway. This is not limited herein.

2. The local gateway receives the first request sent by the MME, where the first request includes an IP address and an end point identifier of a tunnel from the local gateway to the C-GW that are assigned by the C-GW to a user plane of UE.

It should be noted that, in a core network, the MME can directly communicate with the C-GW, for example, control the C-GW to assign user plane information, notify the C-GW of the obtained information, and send a message by using the C-GW.

In this step, the MME controls the C-GW to assign the IP address and the end point identifier of the tunnel from the local gateway to the C-GW. It may be understood that the IP address and the end point identifier of the tunnel from the local gateway to the C-GW enable, to establish the data channel from the local gateway to the C-GW, the local gateway that obtains the information, so that the local gateway can send information to the C-GW by using the data channel, that is, can send information to the MME.

3. The local gateway returns a first response to the MME, where the first response includes an IP address and an end point identifier of a tunnel from the C-GW to the local gateway that are assigned by the local gateway to the user plane of the UE and an IP address and an end point identifier of a tunnel from the eNB to the local gateway that are assigned by the local gateway to the user plane of the UE.

It may be understood that the IP address and the end point identifier of the tunnel from the C-GW to the local gateway that are assigned to the user plane of the UE enable, to establish a data channel from the C-GW to the local gateway, the C-GW that obtains the information, so that the C-GW can send information to the local gateway by using the data channel. Similarly, the IP address and the end point identifier of the tunnel from the eNB to the local gateway that are assigned to the user plane of the UE enable, to establish a data channel from the eNB to the local gateway, the eNB that obtains the information, so that the eNB can send information to the local gateway by using the data channel.

4. The MME sends a second request to the eNB, where the second request is used to request to establish a data channel from the eNB to the local gateway.

5. The eNB receives the second request sent by the MME, where the second request includes the IP address and the end point identifier of the tunnel from the eNB to the local gateway that are assigned by the local gateway to the user plane of the UE.

After obtaining the IP address and the end point identifier of the tunnel from the eNB to the local gateway that are assigned by the local gateway to the user plane of the UE, the eNB may establish the data channel from the eNB to the local gateway. The eNB may send a message to the local gateway by using the data channel, and the UE performs access by using the eNB, that is, the local gateway may receive, by using the data channel, a message sent by the UE.

6. The eNB returns a second response to the MME, where the second response includes an IP address and an end point identifier of a tunnel from the local gateway to the eNB that are assigned by the eNB to the user plane of the UE.

7. The MME sends, to the local gateway, the IP address and the end point identifier of the tunnel from the local gateway to the eNB that are assigned by the eNB to the user plane of the UE.

After obtaining the IP address and the end point identifier of the tunnel from the local gateway to the eNB that are assigned by the eNB to the user plane of the UE, the local gateway may establish the data channel from the local gateway to the eNB, and may send a message to the eNB by using the data channel.

The following separately describes network devices in the embodiments of the present application.

Figure 9:
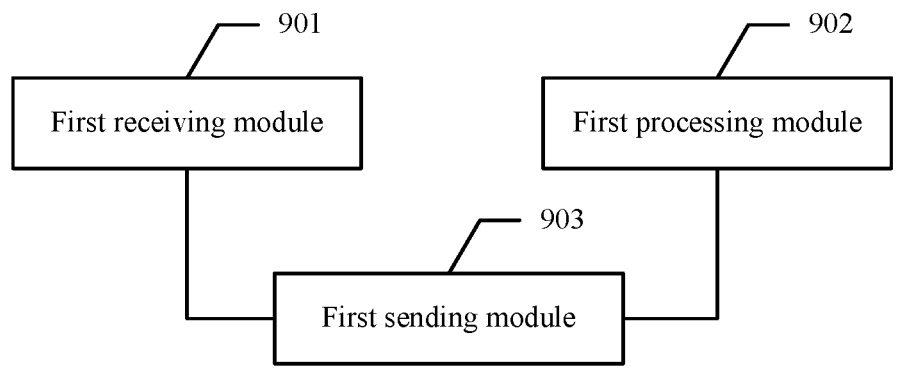
FIG. 9 is a schematic structural diagram of an MME according to an embodiment of the present application.

1. MME:

Referring to FIG. 9, an embodiment of an MME in an embodiment of the present application includes:

a first receiving module 901, configured to receive an access request sent by user equipment UE by using a base station eNB, where the access request carries access information of the UE; and a first processing module 902, configured to: determine, according to the access information of the UE, a first local gateway corresponding to the UE, where the first local gateway is a gateway of a first local network; and establish, for the UE, a user plane bearer that is from the eNB to a gateway C-GW of a core network and that includes the first local gateway used as an intermediate node.

In this embodiment of the present application, when the UE accesses the core network by using the eNB, the first processing module 902 determines the first local gateway corresponding to the UE, where the first local gateway is the gateway of the first local network; and establishes, for the UE, the user plane bearer that is from the eNB to the gateway C-GW of the core network and that includes the first local gateway used as the intermediate node. In this way, because the first local gateway is used as the intermediate node in the user plane bearer, a data connection is established between the eNB and each of the gateway C-GW of the core network and the gateway of the first local network. The UE accesses not only an operator network but also the first local network by using the eNB, so that a user equipment simultaneously accesses the operator network and the local network.

Optionally, in another embodiment of the MME in this embodiment of the present application, before determining, according to the access information of the UE, the first local gateway corresponding to the UE, the first processing module 902 in the MME is further configured to: obtain function information of the eNB; determine, according to the function information of the eNB, whether the eNB supports a local gateway connection; and when determining that the eNB supports the local gateway connection, trigger the step of determining the first local gateway corresponding to the UE.

In this way, completion of a subsequent action is triggered only when the first processing module 902 determines that the eNB supports the local gateway connection, so that system resources are saved.

It may be understood that, the UE may correspond to only one local gateway, or may correspond to multiple local gateways.

Optionally, in another embodiment of the MME in this embodiment of the present application, the access information includes the UE identifier. The UE identifier is used to uniquely identify the UE. When determining, according to the access information of the UE, the first local gateway corresponding to the UE, the first processing module 902 may be specifically configured to search, according to the UE identifier, a user management server for the first local gateway corresponding to the UE.

Optionally, in another embodiment of the MME in this embodiment of the present application, the first local gateway may be a local gateway having a highest priority in multiple local gateways corresponding to the UE.

In this embodiment, the UE corresponds to the multiple local gateways. The first processing module 902 uses, as the first local gateway, the local gateway having the highest priority in the multiple local gateways.

Optionally, in another embodiment of the MME in this embodiment of the present application, the function information of the eNB further includes information about a local gateway accessed by the eNB. The access information includes the UE identifier. The UE identifier is used to uniquely identify the UE. When determining, according to the access information of the UE, the first local gateway corresponding to the UE, the first processing module 902 is specifically configured to determine, according to the information about the local gateway accessed by the eNB and the UE identifier, the first local gateway corresponding to the UE.

In actual application, a local gateway corresponding to the UE may be updated. In another embodiment of the MME in this embodiment of the present application, after the first processing module 902 in the MME establishes, for the UE, the user plane bearer that is from the eNB to the C-GW and that includes the first local gateway used as the intermediate node, the first processing module 902 is further configured to: when determining that the local gateway corresponding to the UE is updated to a third local gateway, establish, for the UE, a user plane bearer that is from the eNB to the C-GW and that includes the third local gateway used as an intermediate node. The third local gateway is a gateway of a third local network.

In this embodiment, the first processing module 902 can determine an updated local gateway having a highest priority, and establish, for the UE, a user plane bearer in which the updated local gateway is used as an intermediate node, so that network system adaptability is enhanced, and performance of interaction with the user is improved.

In actual application, there may be multiple subnets in the local network, and the UE may correspond to some of the subnets. Optionally, in another embodiment of the MME in this embodiment of the present application, the first processing module 902 is further configured to obtain, according to the UE identifier, a first subnet corresponding to the UE. The first subnet is located in the first local network.

The MME further includes:

a first sending module 903, configured to send a first routing instruction to the first local gateway, where the first routing instruction includes an identifier of the first subnet and the UE identifier, and the first routing instruction is used to instruct to route, to the first subnet, data used by the UE to access the first local network.

Optionally, in actual application, when obtaining, according to the UE identifier, the first subnet corresponding to the UE, the first processing module 902 may be specifically configured to: determine, according to the UE identifier, a user group corresponding to the UE; and determine, according to location information of the UE and/or a current time and the user group, the first subnet corresponding to the UE.

In this embodiment, the first processing module 902 can determine the subnet corresponding to the UE in the local network. The first sending module 903 sends the routing instruction to the local gateway, so that the local gateway routes, to the subnet, all data used by the UE to access the local network, so as to implement precise control on network access permission.

It may be understood that alternatively, a correspondence between the UE and the subnet may directly exist, and a correspondence between the UE and the local gateway is then determined according to the correspondence. In another embodiment of the MME in this embodiment of the present application, the first processing module 902 in the foregoing embodiment may be further configured to: determine a second subnet corresponding to the UE, where the second subnet is a subnet having a highest priority in multiple subnets currently corresponding to the UE or a subnet uniquely corresponding to the UE; determine that the second subnet is located in the first local network; and determine that a gateway of the first local network is the first local gateway.

Optionally, in actual application, the first processing module 902 may be specifically configured to: determine a user group corresponding to the UE; and determine, according to location information of the UE and/or a current time and the user group that is determined by the first processing module 902, the second subnet corresponding to the UE.

In this embodiment, the UE corresponds to the subnet. The first processing module 902 can determine the subnet corresponding to the UE, then determine the local network in which the subnet is located, find the local gateway of the local network, and finally determine the local gateway that needs to be used as the intermediate node for establishing the user plane bearer.

Optionally, in another embodiment of the MME in this embodiment of the present application, the first sending module 903 in the foregoing embodiment may be further configured to: send a second routing instruction to the first local gateway. The second routing instruction includes an identifier of the second subnet and an UE identifier, and the routing instruction is used to instruct to route, to the second subnet, the data used by the UE to access the first local network.

In this embodiment of the present application, the first sending module 903 sends the second routing instruction, so that the local gateway routes, to the second subnet that is identified by the identifier of the second subnet and that corresponds to the UE, the data used by the UE to access the first local network, so as to implement precise control on network access permission.

In actual application, a subnet corresponding to the UE may also be updated. After the update, another module may perform corresponding processing. In another embodiment of the MME in this embodiment of the present application, after the first processing module 902 establishes, for the UE, the user plane bearer that is from the eNB to the gateway C-GW of the core network and that includes the first local gateway used as the intermediate node, the first processing module 902 is further configured to: determine that a subnet corresponding to the UE is updated to a third subnet; determine that the third subnet is located in a second local network, wherein the second local network is different from the first local network; determine that a gateway of the second local network is a second local gateway; and establish, for the UE, a user plane bearer that is from the eNB to the C-GW and that includes the second local gateway used as an intermediate node.

In this embodiment of the present application, the first processing module 902 can determine the updated subnet corresponding to the UE, determine, according to the subnet, the local gateway corresponding to the UE, and establish, for the UE, the user plane bearer in which the local gateway is used as the intermediate node, so that network system adaptability is enhanced, and performance of interaction with the user is improved.

Optionally, in another embodiment of the MME in this embodiment of the present application, after the first processing module 902 determines that the gateway of the second local network is the second local gateway, the first sending module 903 is further configured to send a third routing instruction to the second local gateway. The third routing instruction includes an identifier of the third subnet and the UE identifier, and the routing instruction is used to instruct to route, to the third subnet, data used by the UE to access the second local network.

In this embodiment of the present application, the first sending module 903 sends the third routing instruction, so that the local gateway routes, to the third subnet corresponding to the UE, the data used by the UE to access the second local network, so as to implement precise control on network access permission.

Optionally, in another embodiment of the MME in this embodiment of the present application, after establishing, for the UE, the user plane bearer that is from the eNB to the C-GW and that includes the local gateway used as the intermediate node, the first processing module 902 is further configured to: obtain, according to the UE identifier, a network name of the subnet corresponding to the UE; and instruct the first sending module 903 to send the network name to the UE by using a non-access stratum NAS message, so that the UE displays the network name on a user interface.

Optionally, in actual application, the first sending module 903 is further configured to notify the C-GW of the subnet currently corresponding to the UE.

The first receiving module 901 is further configured to receive a domain name system server address that is assigned to the subnet corresponding to the UE and that is returned by the C-GW. A domain name system server identified by the domain name system server address stores a correspondence between a domain name and an IP address of a network device in the subnet corresponding to the UE.

The first sending module 903 is further configured to send, to the UE, the domain name system server address assigned to the subnet corresponding to the UE.

In this embodiment, the first sending module 903 sends the network name of the subnet to the UE, so that the network name can be displayed on the user interface of the UE, so as to help a user more intuitively know a currently accessed subnet, and improve man-machine interaction performance.

Optionally, in another embodiment of the MME in this embodiment of the present application, the first sending module 903 is further configured to notify the C-GW of a local network currently corresponding to the UE.

The first receiving module 901 is further configured to receive a domain name system server address that is assigned to the local network corresponding to the UE and that is returned by the C-GW. A domain name system server identified by the domain name system server address stores a correspondence between a domain name and an IP address of a network device in the local network corresponding to the UE.

The first sending module 903 is further configured to send, to the UE, the domain name system server address assigned to the local network corresponding to the UE.

Optionally, in actual application, when establishing, for the UE, the user plane bearer that is from the eNB to the gateway C-GW of the core network and that includes the first local gateway used as the intermediate node, the first processing module 902 is specifically configured to: control the first receiving module 901 to obtain an IP address and an end point identifier of a tunnel from the local gateway to the C-GW that are assigned by the C-GW, and control the first sending module 903 to send, to the local gateway, the IP address and the end point identifier of the tunnel from the local gateway to the C-GW that are assigned by the C-GW; control the first receiving module 901 to obtain an IP address and an end point identifier of a tunnel from the local gateway to the eNB that are assigned by the eNB, and control the first sending module 903 to send, to the local gateway, the IP address and the end point identifier of the tunnel from the local gateway to the eNB that are assigned by the eNB; and control the first receiving module 901 to obtain an IP address and an end point identifier of a tunnel from the C-GW to the local gateway that are assigned by the local gateway and an IP address and an end point identifier of a tunnel from the eNB to the local gateway that are assigned by the local gateway, and control the first sending module 903 to send, to the C-GW, the IP address and the end point identifier of the tunnel from the C-GW to the local gateway that are assigned by the local gateway, and to send, to the eNB, the IP address and the end point identifier of the tunnel from the eNB to the local gateway that are assigned by the local gateway.

Figure 10:
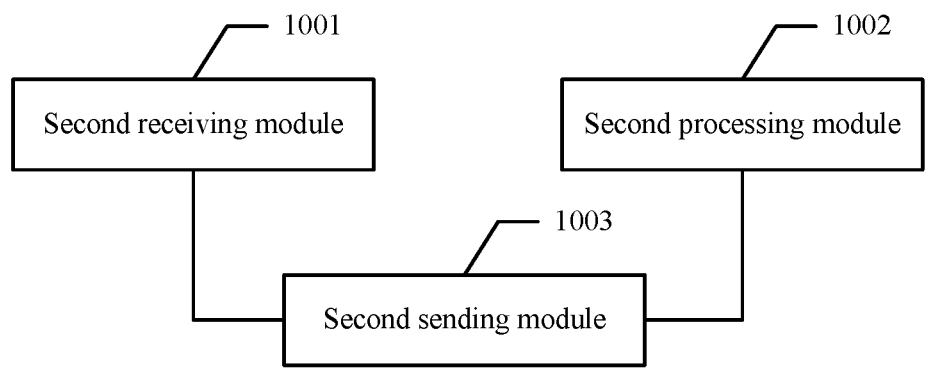
FIG. 10 is a schematic structural diagram of a local gateway according to an embodiment of the present application.

2. Local gateway:

Referring to FIG. 10, an embodiment of a local gateway in an embodiment of the present application includes:

a second receiving module 1001, configured to receive a user plane establishment request sent by a mobility management entity MME, where the user plane establishment request includes information about a user plane bearer that is established by a gateway C-GW of a core network for UE and that is from the local gateway to the C-GW, the UE accesses the core network by using an eNB, and the local gateway is a local gateway corresponding to the UE; and a second processing module 1002, configured to establish, for the UE according to the user plane establishment request, a user plane bearer that is from the eNB to the C-GW and that includes the local gateway used as an intermediate node.

In this embodiment, the second processing module 1002 can establish, for the UE, the user plane bearer in which the local gateway is used as the intermediate node, so that the UE accesses an operator network and a local network in which the local gateway is used as a gateway.

Optionally, in another embodiment of the local gateway in this embodiment of the present application, the second processing module 1002 is further configured to determine whether received data used by the UE to access a network is data used to access the local network.

The local gateway further includes:

a second sending module 1003, configured to: when it is determined that the data used by the UE to access a network is the data used to access the local network, route, to the local network, the data used by the UE to access a network; or when it is determined that the data used by the UE to access a network is not the data used to access the local network, forward, to the C-GW, the data used by the UE to access a network.

In actual application, the local gateway may obtain by itself a subnet identifier corresponding to the UE, or may obtain a subnet identifier by receiving a routing instruction sent by the MME. The following specifically describes, by using the two manners as examples, the local gateway in this embodiment of the present application.

Optionally, in another embodiment of the local gateway in this embodiment of the present application, after the second processing module 1002 establishes, for the UE according to the user plane establishment request, the user plane bearer that is from the eNB to the C-GW and that includes the local gateway used as the intermediate node, and before the second sending module 1003 routes, to the local network, the data used by the UE to access a network, the second processing module 1002 is further configured to determine, according to a UE identifier, a subnet corresponding to the UE. The UE identifier is used to uniquely identify the UE, and the user plane establishment request includes the UE identifier.

When routing, to the local network, the data used by the UE to access a network, the second sending module 1003 is specifically configured to route, to the subnet corresponding to the UE, the data used by the UE to access a network.

Optionally, in another embodiment of the local gateway in this embodiment of the present application, after the second processing module 1002 establishes, for the UE according to the user plane establishment request, the user plane bearer that is from the eNB to the C-GW and that includes the local gateway used as the intermediate node, and before the second sending module 1003 routes, to the local network, the data used by the UE to access a network, the second receiving module 1001 is further configured to receive a routing instruction sent by the MME. The routing instruction includes a subnet identifier and a UE identifier, the UE identifier is used to uniquely identify the UE, and the subnet identifier is used to uniquely identify a subnet.

When routing, to the local network, the data used by the UE to access a network, the second sending module 1003 is specifically configured to route, according to the routing instruction to the subnet identified by the subnet identifier in the routing instruction, the data used by the UE to access a network.

In this embodiment of the present application, the MME obtains the subnet identifier corresponding to the UE, the second receiving module 1001 receives the routing instruction sent by the MME, and the second sending module 1003 routes, according to the routing instruction to the subnet identified by the subnet identifier, the data used by the UE to access the local network, so as to implement fine control on network access permission, and relieve data processing pressure of the local gateway.

Optionally, in another embodiment of the local gateway in this embodiment of the present application, after the second processing module 1002 establishes, for the UE according to the user plane establishment request, the user plane bearer that is from the eNB to the C-GW and that includes the local gateway used as the intermediate node, and before the second sending module 1003 routes, to the local network, the data used by the UE to access a network, the second processing module 1002 is further configured to determine, according to a UE identifier, a subnet corresponding to the UE. The UE identifier is used to uniquely identify the UE, and the user plane establishment request includes the UE identifier.

When routing, to the local network, the data used by the UE to access a network, the second sending module 1003 is specifically configured to route, to the subnet corresponding to the UE, the data used by the UE to access a network.

In this embodiment, after establishing, for the UE, the user plane bearer in which the local gateway is used as the intermediate node, the second processing module 1002 obtains the subnet corresponding to the UE, and the second sending module 1003 routes, to the subnet, the data used by the UE to access the local network, so as to implement fine control on network access permission.

Optionally, in another embodiment of the local gateway in this embodiment of the present application, when determining whether the received data used by the UE to access a network is the data used to access the local network, the second processing module 1002 is specifically configured to: when the data used by the UE to access a network is received, determine, according to a destination IP address of the data used by the UE to access a network, whether the data used by the UE to access a network is the data used to access the local network. The local gateway stores a list of an IP address of a network device in the local network.

Optionally, in another embodiment of the local gateway in this embodiment of the present application, when receiving the user plane establishment request sent by the mobility management entity MME, the second receiving module 1001 is specifically configured to obtain an IP address and an end point identifier of a tunnel from the local gateway to the C-GW that are assigned by the C-GW to a user plane of the UE.

When establishing, for the UE according to the user plane establishment request, the user plane bearer that is from the eNB to the C-GW and that includes the local gateway used as the intermediate node, the second processing module 1002 is specifically configured to: assign, to the user plane of the UE, an IP address and an end point identifier of a tunnel from the C-GW to the local gateway and an IP address and an end point identifier of a tunnel from the eNB to the local gateway; and control the second sending module 1003 to send, to the MME, the IP address and the end point identifier of the tunnel from the C-GW to the local gateway that are assigned by the second processing module 1002 and the IP address and the end point identifier of the tunnel from the eNB to the local gateway that are assigned by the second processing module 1002.

Figure 11:
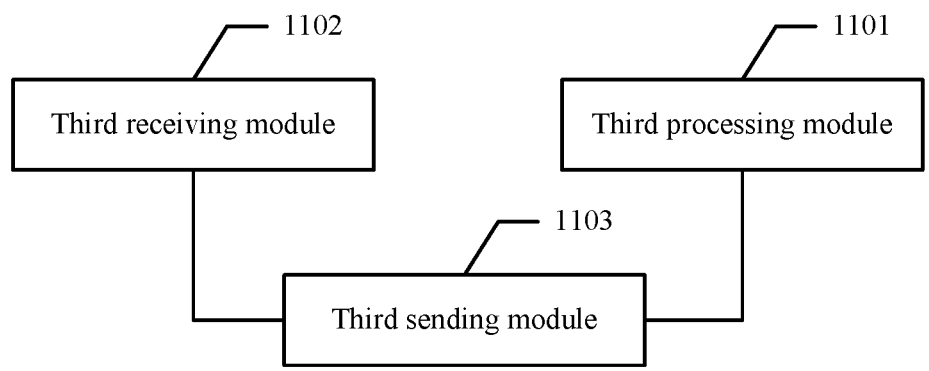
FIG. 11 is a schematic structural diagram of a base station according to an embodiment of the present application.

3. Base station:

Referring to FIG. 11, an embodiment of a base station in an embodiment of the present application includes:

a third processing module 1101, configured to: connect UE and a core network, where a gateway of the core network is a C-GW; and establish, for the UE, a user plane bearer that is from the eNB to the C-GW and that includes a local gateway, corresponding to the UE, used as an intermediate node, where the local gateway is a gateway of a local network;

a third receiving module 1102, configured to receive data used by the UE to access the local network; and a third sending module 1103, configured to: when the data used by the UE to access the local network is received, send, to the local gateway, the data used to access the local network.

In this embodiment, after the third processing module 1101 establishes, for the UE, the user plane bearer in which the local gateway is used as the intermediate node, the third sending module 1103 can send, to the local gateway, the data that is used by the UE to access the local network and that is received by the third receiving module 1102, so that an operator network and the local network are simultaneously accessed.

In actual application, the base station may further obtain a local gateway or a subnet identifier corresponding to the UE, and send the local gateway or the subnet identifier to an MME. Optionally, in another embodiment of the base station in this embodiment of the present application, before establishing, for the UE, the user plane bearer that is from the eNB to the C-GW and that includes the local gateway, corresponding to the UE, used as the intermediate node, the third processing module 1101 is further configured to determine the local gateway or a subnet corresponding to the UE.

The third sending module 1103 is further configured to notify the MME of the determined local gateway or subnet corresponding to the UE.

In this embodiment, the third sending module 1103 may notify the MME of the local gateway or subnet corresponding to the UE that is determined by the third processing module 1101, so as to relieve operation pressure of the MME.

Optionally, in another embodiment of the base station in this embodiment of the present application, when establishing, for the UE, the user plane bearer that is from the eNB to the C-GW and that includes the local gateway, corresponding to the UE, used as the intermediate node, the third processing module 1101 is specifically configured to: control the third receiving module 1102 to obtain an IP address and an end point identifier of a tunnel from the eNB to the local gateway that are assigned by the local gateway to a user plane of the UE; assign, to the user plane of the UE, an IP address and an end point identifier of a tunnel from the local gateway to the eNB; and control the third sending module 1103 to send, to the MME, the IP address and the end point identifier of the tunnel from the local gateway to the eNB that are assigned by the third processing module 1101.

Figure 12:
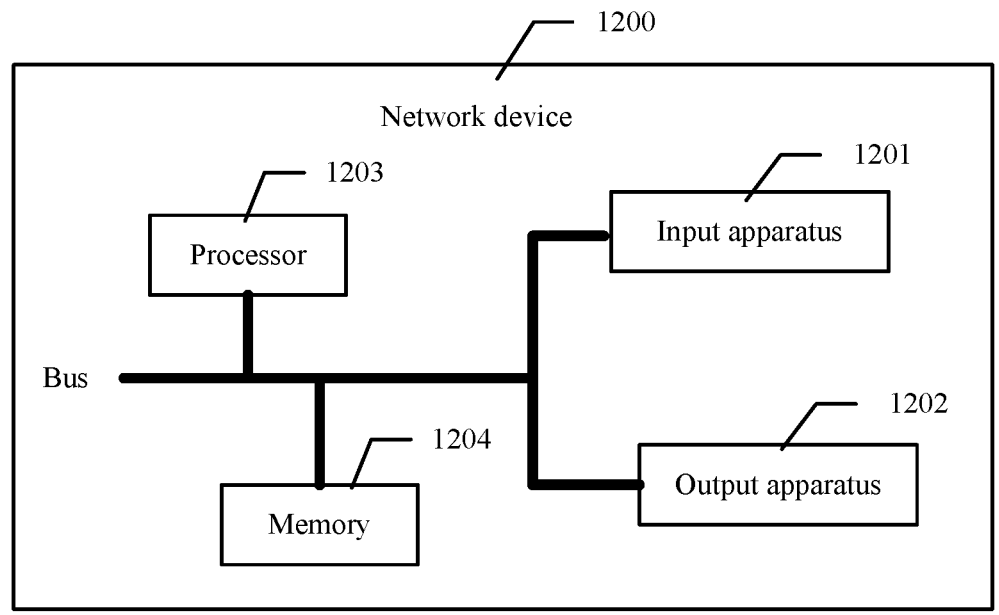
FIG. 12 is a schematic structural diagram of a network device according to an embodiment of the present application.

Referring to FIG. 12, FIG. 12 is a schematic structural diagram of a network device 1200, which may represent an MME, a local gateway, or an base station in an embodiment of the present application. The network device 1200 includes:

an input apparatus 1201, an output apparatus 1202, a processor 1203, and a memory 1204 (there may be one or more processors 1203, and one processor 1203 is used as an example in FIG. 12). In some embodiments of the present application, the input apparatus 1201, the output apparatus 1202, the processor 1203, and the memory 1204 may be connected by using a bus or in another manner, for example, connected by using a bus in FIG. 12.

When the network device 1200 shown in FIG. 12 represents an MME, the processor 1203 is configured to perform the following steps by invoking an operation instruction stored in the memory 1204:

instructing the input apparatus 1201 to receive an access request of user equipment UE that is sent by an base station eNB, where the access request carries access information of the UE;

determining, according to the access information of the UE, a first local gateway corresponding to the UE, where the first local gateway is a gateway of a first local network; and establishing, for the UE, a user plane bearer that is from the eNB to a gateway C-GW of a core network and that includes the first local gateway used as an intermediate node.

In some embodiments of the present application, before performing the step of determining, according to the access information of the UE, a first local gateway corresponding to the UE, the processor 1203 is further configured to perform the following steps:

obtaining function information of the eNB;

determining, according to the function information of the eNB, whether the eNB supports a local gateway connection; and when determining that the eNB supports the local gateway connection, triggering the step of determining, according to the access information of the UE, a first local gateway corresponding to the UE.

In some embodiments of the present application, the access information includes the UE identifier. The UE identifier is used to uniquely identify the UE. When performing the step of determining, according to the access information of the UE, a first local gateway corresponding to the UE, the processor 1203 specifically performs the following step:

searching, according to the UE identifier, a user management server for the first local gateway corresponding to the UE.

In some embodiments of the present application, the first local gateway is a local gateway having a highest priority in multiple local gateways corresponding to the UE.

In some embodiments of the present application, the function information of the eNB further includes information about a local gateway accessed by the eNB. The access information includes the UE identifier. The UE identifier is used to uniquely identify the UE. When performing the step of determining, according to the access information of the UE, a first local gateway corresponding to the UE, the processor 1203 specifically performs the following step:

determining, according to the information about the local gateway accessed by the eNB and the UE identifier, the first local gateway corresponding to the UE.

In some embodiments of the present application, after performing the step of establishing, for the UE, a user plane bearer that is from the eNB to the C-GW and that includes the first local gateway used as an intermediate node, the processor 1203 is further configured to perform the following step:

when determining that a local gateway corresponding to the UE is updated to a third local gateway, establishing, for the UE, a user plane bearer that is from the eNB to the C-GW and that includes the third local gateway used as an intermediate node, where the third local gateway is a gateway of a third local network.

In some embodiments of the present application, the processor 1203 is further configured to perform the following steps:

obtaining, according to the UE identifier, a first subnet corresponding to the UE, where the first subnet is located in the first local network; and sending a first routing instruction to the first local gateway, where the first routing instruction includes an identifier of the first subnet and the UE identifier, and the first routing instruction is used to instruct to route, to the first subnet, data used by the UE to access the first local network.

In some embodiments of the present application, when performing the step of obtaining, according to the UE identifier, a first subnet corresponding to the UE, the processor 1203 specifically performs the following steps:

determining, according to the UE identifier, a user group corresponding to the UE; and determining, according to location information of the UE and/or a current time and the user group, the first subnet corresponding to the UE.

In some embodiments of the present application, after performing the step of establishing, for the UE, a user plane bearer that is from the eNB to a gateway C-GW of a core network and that includes the first local gateway used as an intermediate node, the processor 1203 is further configured to perform the following steps:

determining that a subnet corresponding to the UE is updated to a third subnet;

determining that the third subnet is located in a second local network, wherein the second local network is different from the first local network;

determining that a gateway of the second local network is a second local gateway; and establishing, for the UE, a user plane bearer that is from the eNB to the C-GW and that includes the second local gateway used as an intermediate node.

In some embodiments of the present application, after performing the step of determining that a gateway of the second local network is a second local gateway, the processor 1203 is further configured to perform the following step:

instructing the output apparatus 1202 to send a third routing instruction to the second local gateway, where the third routing instruction includes an identifier of the third subnet and the UE identifier, and the routing instruction is used to instruct to route, to the third subnet, data used by the UE to access the second local network.

In some embodiments of the present application, after performing the step of establishing, for the UE, a user plane bearer that is from the eNB to the C-GW and that includes the local gateway used as an intermediate node, the processor 1203 is further configured to perform the following steps:

obtaining, according to the UE identifier, a network name of the subnet corresponding to the UE; and sending the network name to the UE by using a non-access stratum NAS message, so that the UE displays the network name on a user interface.

In some embodiments of the present application, the processor 1203 is further configured to perform the following steps:

notifying the C-GW of the subnet currently corresponding to the UE;

receiving a domain name system server address that is assigned to the subnet corresponding to the UE and that is returned by the C-GW, where a domain name system server identified by the domain name system server address stores a correspondence between a domain name and an IP address of a network device in the subnet corresponding to the UE; and sending, to the UE, the domain name system server address assigned to the subnet corresponding to the UE.

In some embodiments of the present application, the processor 1203 is further configured to perform the following steps:

notifying the C-GW of a local network currently corresponding to the UE;

receiving a domain name system server address that is assigned to the local network corresponding to the UE and that is returned by the C-GW, where a domain name system server identified by the domain name system server address stores a correspondence between a domain name and an IP address of a network device in the local network corresponding to the UE; and sending, to the UE, the domain name system server address assigned to the local network corresponding to the UE.

In some embodiments of the present application, when performing the step of establishing, for the UE, a user plane bearer that is from the eNB to a gateway C-GW of a core network and that includes the first local gateway used as an intermediate node, the processor 1203 specifically performs the following steps:

instructing the input apparatus 1201 to obtain an IP address and an end point identifier of a tunnel from the local gateway to the C-GW that are assigned by the C-GW, and instructing the output apparatus 1202 to send, to the local gateway, the IP address and the end point identifier of the tunnel from the local gateway to the C-GW that are assigned by the C-GW;

instructing the input apparatus 1201 to obtain an IP address and an end point identifier of a tunnel from the local gateway to the eNB that are assigned by the eNB, and instructing the output apparatus 1202 to send, to the local gateway, the IP address and the end point identifier of the tunnel from the local gateway to the eNB that are assigned by the eNB; and instructing the input apparatus 1201 to obtain an IP address and an end point identifier of a tunnel from the C-GW to the local gateway that are assigned by the local gateway and an IP address and an end point identifier of a tunnel from the eNB to the local gateway that are assigned by the local gateway, and instructing the output apparatus 1202 to send, to the C-GW, the IP address and the end point identifier of the tunnel from the C-GW to the local gateway that are assigned by the local gateway, and to send, to the eNB, the IP address and the end point identifier of the tunnel from the eNB to the local gateway that are assigned by the local gateway.

When the network device 1200 shown in FIG. 12 represents a local gateway, the processor 1203 is configured to perform the following steps by invoking an operation instruction stored in the memory 1204:

instructing the input apparatus 1201 to receive a user plane establishment request sent by a mobility management entity MME, where the user plane establishment request includes information about a user plane bearer that is established by a gateway C-GW of a core network for UE and that is from the local gateway to the C-GW, the UE accesses the core network by using an eNB, and the local gateway is a local gateway corresponding to the UE; and establishing, for the UE according to the user plane establishment request, a user plane bearer that is from the eNB to the C-GW and that includes the local gateway used as an intermediate node.

In some embodiments of the present application, the processor 1203 is further configured to perform the following steps:

determining whether received data used by the UE to access a network is data used to access the local network; and when determining that the data used by the UE to access a network is the data used to access the local network, instructing the output apparatus 1202 to route, to the local network, the data used by the UE to access a network; or when determining that the data used by the UE to access a network is not the data used to access the local network, instructing the output apparatus 1202 to forward, to the C-GW, the data used by the UE to access a network.

In some embodiments of the present application, after performing the step of establishing, for the UE according to the user plane establishment request, a user plane bearer that is from the eNB to the C-GW and that includes the local gateway used as an intermediate node, and before performing the step of routing, to the local network, the data used by the UE to access a network, the processor 1203 is further configured to perform the following step:

determining, according to a UE identifier, a subnet corresponding to the UE, where the UE identifier is used to uniquely identify the UE, and the user plane establishment request includes the UE identifier.

When performing the step of routing, to the local network, the data used by the UE to access a network, the processor 1203 specifically performs the following step:

routing, to the subnet corresponding to the UE, the data used by the UE to access a network.

In some embodiments of the present application, after performing the step of establishing, for the UE according to the user plane establishment request, a user plane bearer that is from the eNB to the C-GW and that includes the local gateway used as an intermediate node, and before performing the step of routing, to the local network, the data used by the UE to access a network, the processor 1203 is further configured to perform the following step:

instructing the input apparatus 1201 to receive a routing instruction sent by the MME, where the routing instruction includes a subnet identifier and a UE identifier, the UE identifier is used to uniquely identify the UE, and the subnet identifier is used to uniquely identify a subnet.

When performing the step of routing, to the local network, the data used by the UE to access a network, the processor 1203 specifically performs the following step:

routing, according to the routing instruction to the subnet identified by the subnet identifier in the routing instruction, the data used by the UE to access a network.

In some embodiments of the present application, when performing the step of determining whether received data used by the UE to access a network is data used to access the local network, the processor 1203 specifically performs the following step:

when the data used by the UE to access a network is received, determining, according to a destination IP address of the data used by the UE to access a network, whether the data used by the UE to access a network is the data used to access the local network, where the memory 1204 stores a list of an IP address of a network device in the local network.

In some embodiments of the present application, when performing the step of instructing the input apparatus 1201 to receive a user plane establishment request sent by a mobility management entity MME, the processor 1203 specifically performs the following step:

instructing the input apparatus 1201 to obtain an IP address and an end point identifier of a tunnel from the local gateway to the C-GW that are assigned by the C-GW to a user plane of the UE.

When performing the step of establishing, for the UE according to the user plane establishment request, a user plane bearer that is from the eNB to the C-GW and that includes the local gateway used as an intermediate node, the processor 1203 specifically performs the following steps:

assigning, to the user plane of the UE, an IP address and an end point identifier of a tunnel from the C-GW to the local gateway and an IP address and an end point identifier of a tunnel from the eNB to the local gateway; and instructing the output apparatus 1202 to send, to the MME, the assigned IP address and end point identifier of the tunnel from the C-GW to the local gateway and the assigned IP address and end point identifier of the tunnel from the eNB to the local gateway.

When the network device 1200 shown in FIG. 12 represents an eNB, the processor 1203 is configured to perform the following steps by invoking an operation instruction stored in the memory 1204:

connecting UE and a core network, where a gateway of the core network is a C-GW;

establishing, for the UE, a user plane bearer that is from the eNB to the C-GW and that includes a local gateway, corresponding to the UE, used as an intermediate node, where the local gateway is a gateway of a local network; and when the input apparatus 1201 receives data used by the UE to access the local network, instructing the output apparatus 1202 to send, to the local gateway, the data used to access the local network.

In some embodiments of the present application, before the processor 1203 performs the step of establishing, for the UE, a user plane bearer that is from the eNB to the C-GW and that includes a local gateway, corresponding to the UE, used as an intermediate node, the processor 1203 is further configured to perform the following steps:

determining the local gateway or a subnet corresponding to the UE; and instructing the output apparatus 1202 to notify an MME of the determined local gateway or subnet corresponding to the UE.

In some embodiments of the present application, when performing the step of establishing, for the UE, a user plane bearer that is from the eNB to the C-GW and that includes a local gateway, corresponding to the UE, used as an intermediate node, the processor 1203 specifically performs the following steps:

instructing the input apparatus 1201 to obtain an IP address and an end point identifier of a tunnel from the eNB to the local gateway that are assigned by the local gateway to a user plane of the UE;

assigning, to the user plane of the UE, an IP address and an end point identifier of a tunnel from the local gateway to the eNB; and instructing the output apparatus 1202 to send, to the MME, the assigned IP address and end point identifier of the tunnel from the local gateway to the eNB.

Figure 13:
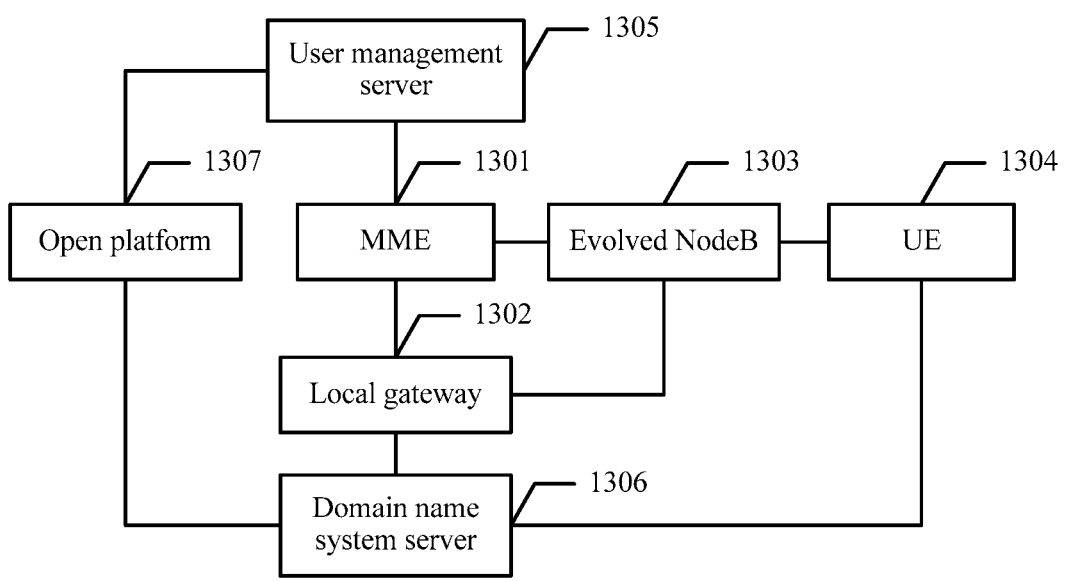
FIG. 13 is a schematic structural diagram of a system for accessing a local network according to an embodiment of the present application.

The following describes a system for accessing a local network in an embodiment of the present application. Referring to FIG. 13, a system for accessing a local network in an embodiment of the present application includes:

an MME 1301 shown in any one of the embodiments corresponding to FIG. 9 or FIG. 12, a local gateway 1302 shown in any one of the embodiments corresponding to FIG. 10 or FIG. 12, a base station 1303 shown in any one of the embodiments corresponding to FIG. 11 or FIG. 12, and UE 1304.

Optionally, in another embodiment, the system may further include:

a user management server 1305, configured to store a correspondence between the UE and a subnet and/or a local gateway; and a domain name system server 1306, configured to: store a correspondence between a domain name and an IP address of a network device in a subnet corresponding to the UE, and covert a domain name of a service server in the subnet corresponding to the UE to an IP address of the service server.

Optionally, in actual application, the system may further include:

an open platform 1307, configured to configure the user management server 1305 and the domain name system server 1306, or the local gateway 1302.

It may be clearly understood by persons skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of the present application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present application essentially, or the part contributing to the prior art, or all or some of the technical solutions may be implemented in a form of a software product. The computer software product is stored in a storage medium and includes several instructions for instructing a computer device (which may be a personal computer, a server, a network device, or the like) to perform all or some of the steps of the methods described in the embodiments of the present application. The foregoing storage medium includes any medium that can store program code, such as a USB flash drive, a removable hard disk, a read-only memory (ROM), a random access memory (RAM), a magnetic disk, or an optical disc.

The foregoing embodiments are merely intended for describing the technical solutions of the present application, but not for limiting the present application. Although the present application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present application.

What is claimed is:

1. A method for accessing a local network, the method comprising:

establishing, by a management entity, for a user equipment (UE), a data channel that is between a base station accessed by the UE and a gateway of a core network and that comprises a local gateway of a local network as an intermediate node, wherein the establishing the data channel comprises:

sending tunnel information of the gateway of the core network to the local gateway, and sending tunnel information of the base station to the local gateway; and sending first tunnel information of the local gateway to the gateway of the core network, and sending second tunnel information of the local gateway to the base station, and wherein the method further comprises:

receiving, by the local gateway, data of the UE from the base station; and in response to determining that the received data is used to access the local network, routing, by the local gateway, the data to the local network.

2. The method according to claim 1, further comprising:

in response to determining that the data is used to access the core network, forwarding, by the local gateway, the data to the gateway of the core network.

3. The method according to claim 1, wherein the local gateway stores a list of IP addresses of network devices in the local network.

4. The method according to claim 1, wherein:

the tunnel information of the gateway of the core network is for a tunnel from the local gateway to the gateway of the core network;

the tunnel information of the base station is for a tunnel from the local gateway to the base station;

the first tunnel information of the local gateway is for a tunnel from the gateway of the core network to the local gateway; and the second tunnel information of the local gateway is for a tunnel from the base station to the local gateway.

5. The method according to claim 1, wherein the tunnel information comprises: an IP address and an end point identifier of a tunnel.

6. The method according to claim 4, further comprising:

assigning, by the gateway of the core network, the tunnel information of the gateway of the core network for the tunnel from the local gateway to the gateway of the core network;

assigning, by the base station, the tunnel information of the base station for the tunnel from the local gateway to the base station;

assigning, by the local gateway, the first tunnel information of the local gateway for the tunnel from the gateway of the core network to the local gateway; and assigning, by the local gateway, the second tunnel information of the local gateway for the tunnel from the base station to the local gateway.

7. The method according to claim 1, wherein in determining that the received data is used to access the local network comprises: determining that the received data is used to access the local network according to destination IP information of the data.

8. The method according to claim 7, wherein the destination IP information comprises: destination IP address.

9. A system, comprising, a management entity and a local gateway of a local network, wherein:

the management entity is configured to establish for a user equipment (UE), a data channel that is between a base station accessed by the UE and a gateway of a core network and that comprises the local gateway of the local network as an intermediate node, wherein to establish the data channel, the management entity is configured to: send tunnel information of the gateway of the core network to the local gateway, send tunnel information of the base station to the local gateway, send first tunnel information of the local gateway to the gateway of the core network, and send second tunnel information of the local gateway to the base station; and the local gateway is configured to receive data of UE from the base station, and route the data to the local network in response to determining the received data from the base station is used to access the local network.

10. The system according to claim 9, wherein the local gateway is configured to:

forward the data to the gateway of the core network in response to determining the data is used to access the core network.

11. The system according to claim 9, wherein the local gateway is configured to store a list of IP addresses of network devices in the local network.

12. The system according to claim 9, wherein:

the tunnel information of the gateway of the core network is for a tunnel from the local gateway to the gateway of the core network;

the tunnel information of the base station is for a tunnel from the local gateway to the base station;

the first tunnel information of the local gateway is for a tunnel from the gateway of the core network to the local gateway; and the second tunnel information of the local gateway is for a tunnel from the base station to the local gateway.

13. The system according to claim 9, wherein the tunnel information comprises: an IP address and an end point identifier of a tunnel.

14. The system according to claim 12, wherein the system further comprises the gateway of the core network and the base station, and wherein:

the gateway of the core network is configured to assign the tunnel information of the gateway of the core network for the tunnel from the local gateway to the gateway of the core network;

the base station is configured to assign the tunnel information of the base station for the tunnel from the local gateway to the base station;

the local gateway is configured to assign the first tunnel information of the local gateway for the tunnel from the gateway of the core network to the local gateway; and the local gateway is configured to assign the second tunnel information of the local gateway for the tunnel from the base station to the local gateway.

15. The system according to claim 9, wherein in determining that the received data is used to access the local network, the local gateway is configured to determine that the received data is used to access the local network according to destination IP information of the data.

16. The system according to claim 15, wherein the destination IP information comprises: destination IP address.

17. A local gateway of a local network, comprising:

a memory storing instructions; and one or more processors in communication with the memory, wherein the one or more processors execute the instructions to:

exchange messages with a management entity to establish for a user equipment (UE), a data channel that is between a base station accessed by the UE and a gateway of a core network and that comprises the local gateway of the local network as an intermediate node, wherein in the exchanging messages, the one or more processors execute the instructions to: receive tunnel information of the gateway of the core network from the management entity, and receive tunnel information of the base station from the management entity;

receive data of the UE from the base station; and route the data to the local network in response to determining the received data is used to access the local network.

18. The local gateway according to claim 17, wherein the one or more processors execute the instructions to:

forward the data to the gateway of the core network in response to determining the data is used to access the core network.

19. The local gateway according to claim 17, wherein the local gateway stores a list of IP addresses of network devices in the local network.

20. A non-transitory computer readable medium, comprising computer program code, which, when executed by a processor, causes the processor to:

exchange messages with a management entity to establish for a user equipment (UE), a data channel that is between a base station accessed by the UE and a gateway of a core network and that comprises a local gateway of a local network as an intermediate node, wherein in the exchanging messages, the one or more processors execute the instructions to: receive tunnel information of the gateway of the core network from the management entity, and receive tunnel information of the base station from the management entity;

receive data of the UE from the base station; and route the data to the local network in response to determining the received data is used to access the local network.

* * * * *

UNITED STATES PATENT AND TRADEMARK OFFICE
CERTIFICATE OF CORRECTION

PATENT NO. : 11,051,351 B2  
APPLICATION NO. : 16/945356  
DATED : June 29, 2021  
INVENTOR(S) : Jin Page 1 of 1

It is certified that error appears in the above-identified patent and that said Letters Patent is hereby corrected as shown below:

In the Claims

Claim 20: Column 54, Line 46: "20. Anon-transitory computer readable medium, compris-" should read -- 20. A non-transitory computer readable medium, compris- --.

Signed and Sealed this
Twenty-sixth Day of July, 2022

Katherine Kelly Vidal
*Director of the United States Patent and Trademark Office*